United States Patent
Lablans

(10) Patent No.: US 9,502,003 B2
(45) Date of Patent: Nov. 22, 2016

(54) APPARATUS AND METHODS TO DISPLAY A MODIFIED IMAGE

(71) Applicant: Peter Lablans, Morris Township, NJ (US)

(72) Inventor: Peter Lablans, Morris Township, NJ (US)

(73) Assignee: Spatial Cam LLC, Morristown, NJ (US)

( * ) Notice: Subject to any disclaimer, the term of this patent is extended or adjusted under 35 U.S.C. 154(b) by 0 days.

(21) Appl. No.: 14/815,920

(22) Filed: Jul. 31, 2015

(65) Prior Publication Data

US 2015/0340016 A1    Nov. 26, 2015

Related U.S. Application Data

(63) Continuation-in-part of application No. 14/147,569, filed on Jan. 5, 2014, and a continuation-in-part of application No. 14/292,883, filed on May 31, 2014, now abandoned.

(51) Int. Cl.
| | |
|---|---|
| H04N 7/18 | (2006.01) |
| G09G 5/395 | (2006.01) |
| G06K 9/00 | (2006.01) |
| G06K 9/03 | (2006.01) |
| G06Q 30/00 | (2012.01) |
| H04N 21/40 | (2011.01) |
| H04N 21/454 | (2011.01) |
| G03B 35/08 | (2006.01) |
| G03B 37/04 | (2006.01) |

(52) U.S. Cl.
CPC ........... *G09G 5/395* (2013.01); *G06K 9/00523* (2013.01); *G06K 9/033* (2013.01); *G06Q 30/00* (2013.01); *H04N 21/40* (2013.01); *H04N 21/454* (2013.01); *G03B 35/08* (2013.01); *G03B 37/04* (2013.01); *H04N 7/18* (2013.01)

(58) Field of Classification Search
USPC .......................................... 348/47
See application file for complete search history.

(56) References Cited

U.S. PATENT DOCUMENTS

| | | |
|---|---|---|
| 5,121,342 A | 6/1992 | Szymborsk et al. |
| 5,606,609 A | 2/1997 | Houser |
| 6,201,811 B1 | 3/2001 | Larsson et al. |
| 6,839,844 B1 | 1/2005 | Okano et al. |
| 6,940,545 B1 | 9/2005 | Ray et al. |
| 7,240,210 B2 | 7/2007 | Mihcak |
| 8,149,280 B2 | 4/2012 | Yoda |
| 8,213,675 B2 | 7/2012 | Kim et al. |
| 8,515,062 B2 | 8/2013 | Nakagata et al. |

(Continued)

OTHER PUBLICATIONS

Survey on Moving Object Tracking in Video, by Barga Deori and Dalton Meitei Thounaojam in International Journal on Information Theory (IJIT), vol. 3, No. 3, Jul. 2014, downloaded from <http://airccse.org/journal/ijit/papers/3314ijit04.pdf>.

(Continued)

*Primary Examiner* — Leron Beck

(57) ABSTRACT

A digital image is obtained from a camera in a smartphone and is processed by a processor on the smartphone to modify a part but not all of the pixels in a frame of the digital image, which is a digital video image, which is modified by image processing in accordance with a modification mask and reversible modification instructions, and is transmitted to a second smartphone with a display screen to display the modified image. Image processing data are transmitted to the second smartphone to enable restoring the original digital video image from the partially reversibly modified image and to be displayed in unmodified form on the display screen.

20 Claims, 19 Drawing Sheets

(56) References Cited

U.S. PATENT DOCUMENTS

| | | |
|---|---|---|
| 8,700,991 B1 | 4/2014 | Gigliotti et al. |
| 2005/0097408 A1* | 5/2005 | Palin .................... H04B 1/7183 |
| | | 714/700 |
| 2008/0002911 A1 | 1/2008 | Eisen et al. |
| 2008/0181396 A1 | 7/2008 | Balakrishnan et al. |
| 2011/0179011 A1 | 7/2011 | Cardno et al. |
| 2013/0104239 A1 | 4/2013 | McLachlan et al. |
| 2013/0156186 A1 | 6/2013 | Candelore et al. |
| 2014/0086309 A1 | 3/2014 | Beer-Gingold et al. |
| 2014/0281946 A1* | 9/2014 | Avni ..................... G06T 1/0021 |
| | | 715/268 |

OTHER PUBLICATIONS

8. Design of Adders, by J.A. Abraham, Sep. 21, 2011, Department of Electrical and Computer Engineering, the University of Texas at Austin downloaded from <URLwww.cerc.utexas.edu/~jaa/vlsi/lectures/8-1.pdf>.

Non-Final Office Action in U.S. Appl. No. 14/292,883 dated Jan. 30, 2015.

* cited by examiner

```
function y=normgim(x)
% normalize image array x to a double array y
lent=size(x);
lr=lent(1);
lc=lent(2);
yy=zeros(lr,lc);
y=zeros(lr,lc);
for i1=1:lr
    for i2=1:lc
        aa=x(i1,i2);
        yy(i1,i2)=aa;
    end
end
for i1=1:lr
    for i2=1:lc
        bb=floor(yy(i1,i2)/32);
        ym(i1,i2)=(bb+1)*32;
        y(i1,i2)=bb+1;
    end
end
imshow(ym, [0 255]);
``` modification mask

```
1   % create a corruption mask for a
2   % 75 by 100 pixel image
3   %fp=[0 1 2 3 4 5 6 7;1 0 4 7 2 6 5 3;
4   %    2 4 0 5 1 3 7 6;3 7 5 0 6 2 4 1;
5   %    4 2 1 6 0 7 3 5;5 6 3 2 7 0 1 4;
6   %    6 5 7 4 3 1 0 2;7 3 6 1 5 4 2 0]+1;
7   %mul=[0 0 0 0 0 0 0 0;0 1 2 3 4 5 6 7;
8   %    0 2 3 4 5 6 7 1;0 3 4 5 6 7 1 2;
9   %    0 4 5 6 7 1 2 3;0 5 6 7 1 2 3 4;
10  %    0 6 7 1 2 3 4 5;0 7 1 2 3 4 5 6]+1;
11  % generate 8-state KL sequence of 7500
12  % 8-state symbols
13  k1=3;
14  k2=1;
15  k3=3;
16  k4=6;
17  shifts=[3 5 8 6];
18  mul1=mul(k1,:);
19  mul2=mul(k2,:);
20  mul3=mul(k3,:);
21  mul4=mul(k4,:);
22  shifts=[3 5 8 6];
23  for i=1:7500
24      u4=shifts(4);
25      u3=shifts(3);
26      u2=shifts(2);
27      u1=shifts(1);
28      i4=mul4(u4);
29      i3=mul3(u4);
30      i2=mul2(u4);
31      i1=mul1(u4);
32      temp1=fp(u1,i2);
33      temp2=fp(u2,i3);
34      temp3=fp(u3,i4);
35      out(i)=i1;
36      shifts(4)=temp3;
37      shifts(3)=temp2;
38      shifts(2)=temp1;
39      shifts(1)=i1;
40  end
```

FIG. 22A

```
41    % identify symbol 6  =symbol 5 in origin 0
42    iout=zeros(1,7500)+256;
43    for p=1:7500
44        iout(p)=(out(p)==6)*iout(p);
45    end
46    imout=zeros(75,100);
47    % create mask
48        for r=1:75
49            for c=1:100
50                ind=(r-1)*100+c;
51                imout(r,c)=iout(ind);
52            end
53        end
54    exout=imout;
55    % extend 6-state symbol 6 with 3 elements
56    % and extend for 3 rows
57    size(imout)
58    r=1;
59    while r<76
60        % m=0 is unmodified; m = 1 is modified
61        row=imout(r,:);
62        m=0;
63        for c=98:-1:1
64            x=(row(c)==256);
65            row(c+1:c+2)=x*row(c+1:c+2);
66            m=m+1*(row(c)==256);
67        end
68        exout(r,:)=row;
69        if m==0
70            if (75-r)>2
71                exout(r+1,:)=row;
72                exout(r+2,:)=row;
73                d=3;
74            end
75            if (75-r)==2
76                exout(r+1,:)=row;
77                exout(r+1,:)=row;
78                d=3;
79            end
```

FIG. 22B

```
80 -            if (75-r)==1
81 -                exout(r+1,:)=row;
82 -                d=3;
83 -            end
84 -            if (75-r)==0
85 -                d=3;
86 -            end
87 -            r=r+d;
88 -        else
89 -            r=r+1;
90 -        end
91 -    end
92 -    image(exout)
93 -    colormap(gray(256))
``` modified image

```
1    function y=modim8(mask,im1)
2    % modify normalised image im1 with 8-state mask
3    inv8=[5 6 7 8 1 2 3 4];% the modifying reversible
4    % 8-state inverter
5    % determine size of image
6    lent=size(mask);
7    r=lent(1);
8    c=lent(2);
9    mim=im1 % the modified image same size as image im1
10   dim=im1;
11   for i1=1:r
12       for i2=1:c
13           aa=mask(i1,i2);
14           if aa==256
15               mim(i1,i2)=im1(i1,i2)*32;% to 256 level
16               dim(i1,i2)=im1(i1,i2);% leave 8 level
17           else
18               bb=inv8(im1(i1,i2));
19               mim(i1,i2)=bb*32;% to 256 level
20               dim(i1,i2)=bb;% leave 8 level
21           end
22       end
23   end
24   y=dim;
25   image(mim)
26   colormap(gray(256))
```

FIG. 24

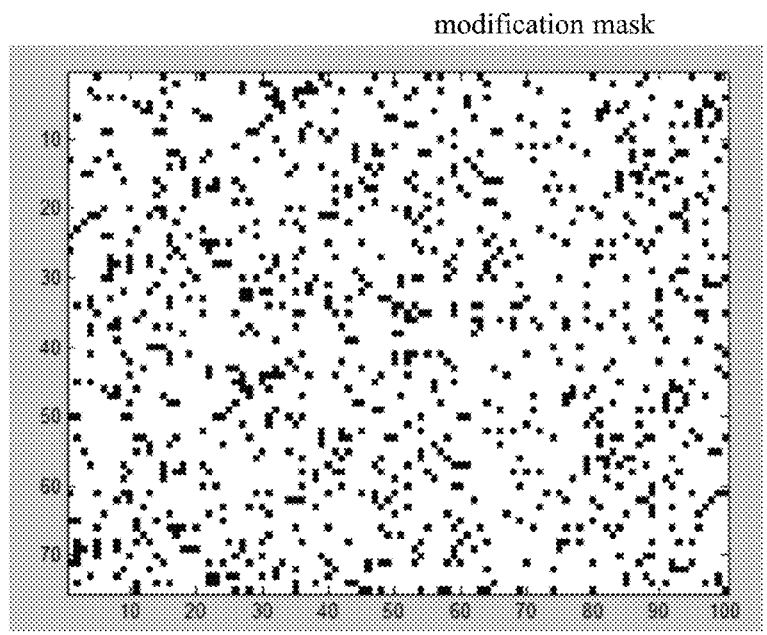

modification mask

FIG. 25

APPARATUS AND METHODS TO DISPLAY A MODIFIED IMAGE

STATEMENT OF RELATED CASES

This application is a continuation-in-part of U.S. patent application Ser. No. 14/147,569 filed on Jan. 5, 2014, which is incorporated herein by reference. This application is also a continuation-in-part of U.S. patent application Ser. No. 14/292,883 filed on May 31, 2014, which is incorporated herein by reference.

BACKGROUND OF THE INVENTION

The present invention relates to displaying an image on a display screen that is partially modified. The image is a digital image with discrete pixels which can be represented and transmitted by signals. An image mask is generated in according with which pixels in a frame of the digital image are modified. The image mask identifies less than 100% of the pixels in a frame for modification. A user can still ascertain at least some details of the displayed modified image, but not in its original quality.

Based on displaying a partially modified digital media stream, which may be a digital image, a digital video, a digital sound stream, a digital document or any digital symbol stream that can be reviewed or played on a review medium, such as a computer screen display, an audio display such as a loudspeaker, print paper or any other display that provides an output or signal that can be reviewed, if necessary after appropriate transformation or conversion, from digital form into reviewable form, a user may decide to obtain, such as purchasing, an unmodified media stream.

It is believed that currently no adequate apparatus and methods are available that automatically generate a modification mask and that allow to reverse the modified digital medium stream into its original, unmodified form. In one embodiment a modified digital media stream should be realized without increasing or significantly increasing redundancy in the digital medium stream.

Accordingly, novel and improved apparatus and methods providing automatic generation of a modification mask in a digital medium screen for partial modification and/or reversing a partial modification in a digital medium stream are required.

SUMMARY OF THE INVENTION

In accordance with an aspect of the present invention an apparatus is provided to process a digital video stream of pixels generated by a camera, each pixel being represented by one or more signals, comprising a source memory enabled to store and provide data including instructions, a processor configured to retrieve and execute instructions from the source memory to perform the steps: obtaining the digital video stream of pixels generated by the camera, retrieving a modification mask that identifies part of a first digital video frame in the digital video stream of pixels for reversible modification, reversibly modifying a plurality of pixels in the digital video stream in accordance with the modification mask to create a reversibly modified digital video stream and transmitting the reversibly modified digital video stream to a viewing device for display on a display screen.

In accordance with a further aspect of the present invention an apparatus is provided, further comprising: a processor on the viewing device obtaining the modification mask and de-modification instructions that reverses the reversible modification of the first video frame; and the processor on the viewing device processing the reversibly modified digital video stream in accordance with the modification mask and the de-modification instructions to generate a de-modified first frame of the reversibly modified digital video stream; and the display screen on the viewing device displaying the demodified first frame of the reversibly modified digital video stream.

In accordance with yet a further aspect of the present invention an apparatus is provided, wherein the display screen on the viewing device displays the first frame of the reversibly modified digital video stream.

In accordance with yet further aspect of the present invention an apparatus is provided, wherein a modification mask is based on a sequence of symbols generated by a sequence generator.

In accordance with yet further aspect of the present invention an apparatus is provided, wherein the modification mask is selected from a memory containing a plurality of modification masks.

In accordance with a further aspect of the present invention an apparatus is provided, wherein each modification mask corresponds to a specific video frame.

In accordance with yet a further aspect of the present invention an apparatus is provided, wherein an area on a screen is identified and the processor extracts the mask from the area that is identified.

In accordance with yet a further aspect of the present invention an apparatus is provided, wherein the area contains at least a part of a moving object or person and the processor tracks the part of the moving object or person to create a moving mask.

In accordance with yet a further aspect of the present invention an apparatus is provided, wherein the apparatus is a smartphone.

In accordance with yet a further aspect of the present invention an apparatus is provided, wherein the reversibly modifying is performed by a non-binary inverter or a non-binary two argument switching function on the processor.

In accordance with another aspect of the present invention a method is provided for partially modifying a digital video stream of pixels generated by a camera, each pixel being represented by one or more signals, comprising: a processor obtaining the digital video stream of pixels generated by the camera, retrieving a modification mask that identifies part of a first digital video frame in the digital video stream of pixels for reversible modification, reversibly modifying a plurality of pixels in the digital video stream in accordance with the modification mask to create a reversibly modified digital video stream and transmitting the reversibly modified digital video stream to a viewing device for display on a display screen.

In accordance with yet another aspect of the present invention a method is provided, further comprising: a processor on the viewing device obtaining the modification mask and de-modification instructions that reverses the reversible modification of the first video frame; and the processor on the viewing device processing the reversibly modified digital video stream in accordance with the modification mask and the de-modification instructions to generate a de-modified first frame of the reversibly modified digital video stream; and the display screen on the viewing device displaying the demodified first frame of the reversibly modified digital video stream.

In accordance with yet another aspect of the present invention a method is provided, wherein the display screen on the viewing device displays the first frame of the reversibly modified digital video stream.

In accordance with yet another aspect of the present invention a method is provided, wherein a modification mask is based on a sequence of symbols generated by a sequence generator.

In accordance with yet another aspect of the present invention a method is provided, wherein the modification mask is selected from a memory containing a plurality of modification masks.

In accordance with yet another aspect of the present invention a method is provided, wherein each modification mask corresponds to a specific video frame.

In accordance with yet another aspect of the present invention a method is provided, wherein an area on a screen is identified and the processor extracts the mask from the area that is identified.

In accordance with yet another aspect of the present invention a method is provided, wherein the area contains at least a part of a moving object or person and the processor tracks the part of the moving object or person to create a moving mask.

In accordance with yet another aspect of the present invention a method is provided, wherein the apparatus is a smartphone.

In accordance with yet another aspect of the present invention a method is provided, wherein the reversibly modifying is performed by a non-binary inverter or non-binary two argument switching function on the processor.

aspect of the present invention an apparatus is provided for correcting errors in a sequence of k n-state data symbols, an n-state symbol being represented by a signal, with n>2, and k≥1, comprising, a memory enabled to store instructions, a processor that retrieves and executes ate inverter, selected from a plurality of n-state inverters.

In accordance with yet a further aspect of the present invention, a method is provided, wherein the n-state logic function is a two argument logic function.

DESCRIPTION OF THE DRAWINGS

FIG. 22A, FIG. 22B and FIG. 22C each show a screenshot of a program that performs steps in accordance with one or more aspects of the present invention;

FIG. 23 illustrates the image of FIG. 19 corrupted in accordance with the mask of FIG.

FIG. 24 shows a screenshot of a program provided in accordance with an aspect of the present invention;

FIG. 25 shows a modification mask that is applied to the image of FIG. 19 to generate a corrupted image;

DESCRIPTION OF A PREFERRED EMBODIMENT

Figure 1:
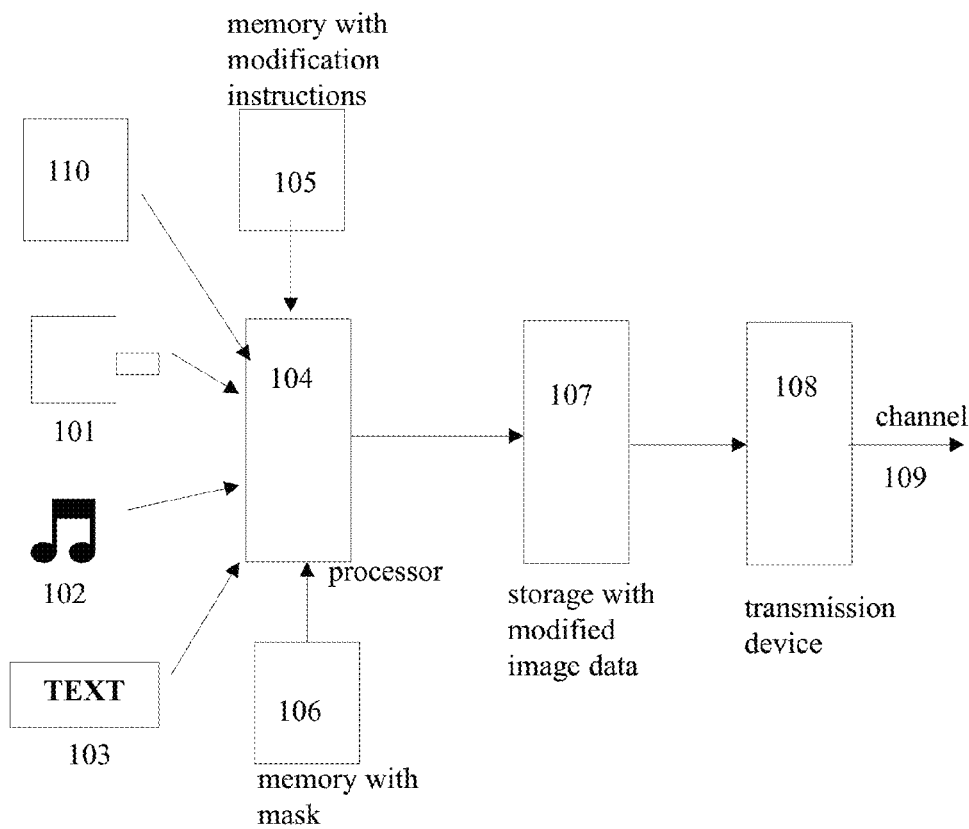
FIGS. 1, 2, 3, 4, 5, 6 and 7 illustrate apparatus and systems used to perform the steps described herein in accordance with another aspect of the present invention.

Aspects of the present invention relate to a digital media stream wherein some elements are of the digital media stream, but not all, are modified in a reversible way by a machine, which is a switching machine. A computer is a switching machine which is built from, usually binary, switching elements. A digital medium stream, in accordance with an aspect of the present invention, contains at least one digital image, or a plurality of digital images in the case of digital video images. The image content of a digital image or a digital image frame is image data. For display on a screen, digital data is arranged in individual data elements or picture elements, usually called pixels, in a shape of a 2D matrix. The pixels can be written as consecutive horizontal pixel lines on a screen. Each pixel may have an intensity and a color representation. A pixel may represent a black/white value; a grey value; an RGB (red/green/blue) value; a transparency value or any other value that is useful in image representation. A correct order and arrangement of pixels is determined in an original image, for instance by scanning or recording with a sensor, or by image generation on a computer. The pixels are coded in pixel representation, which may be for instance a 8 bit representation or a 24 bit representation.

Often, the pixels of an image which are usually displayed in a matrix, are transmitted or stored in a sequential manner. Reconstruction of the pixels for display on a screen at a receiving end requires the reconstruction of the sequential representation into the appropriate matrix representation. This can be done by counting number of bits or signals under the knowledge how many bits there are in a pixel, how many pixels there are on a line and how many lines there are in a frame. In some embodiments, pixels and/or pixel lines and/or pixel frames are separated by special signals, which may be considered house-keeping signals, are used to reconstruct the pixels in the correct location of an image and are used to activate the correct physical pixel location with the correct parameters on the display screen to recreate the digital image. Digital images come in different formats, resolutions and representations. However, all digital images herein have in common that they are formed from an arrangement of discrete pixels represented as discrete data elements.

Sound is another form of a digital media stream. Sound as part of a digital media stream is generally samples sound.

The sound is sampled at a predetermined sampling rate and each sound sample represented by a word of bits. A common binary representation of a sound sample is 16 bits, though other representations such as 8 bits or 24 bits are also used. A digital sound stream is a sequence of coded samples, each sample coded as a series of bits. At a receiving side the sample values are reconstructed, usually filtered and provided to a loudspeaker for display as a sound.

Accordingly, a digital media stream, when not being displayed, commonly exists as a stream of discrete data or signals or non-transitory marks on a medium such as marks on a CD or charges on a memory or magnetic domains on a magnetic disk.

Pixels in an image have at least two meanings: a) the representation of the pixel in data form, for instance an 8 bit or 24 bit word. However, on a display screen a pixel is a location with an element that is to be activated to obtain a certain color and intensity. A screen pixel may be 3 elements that are activated individually but are so close that from a certain distance it looks like a certain pixel. One of ordinary skill would know that screen pixels are physical elements that are part of a viewable physical image. Pixels in data form (like digital sound samples) are merely digital representations that can be stored, transmitted and received. Clearly looking at pixel data does not create an image, but a data-to-light conversion device is required and provided to activate a physical screen image.

Image processing, as provided herein, operates on the digital data that represents pixels. The physical image is not processed. The physical image is the physical result of the image data. This is well known to one of ordinary skill. Furthermore, the representation of a single pixel (or sound sample or text character) which is often a plurality of bits, can be considered to be a single symbol. So, if a pixel is represented by an 8 bits word, one may give that 8-bits word a name. For instance an 8-bit pixel may be [1 0 1 0 1 1 1 1]. One may replace that pixel with a single name or with a symbol. The limitations of our alphabet do not provide a unique single symbol. But we may give the 8-bit word a unique name that represents a single symbol. For instance we may call [1 0 1 0 1 1 1 1] Juliet. We may also give it a numeral representation, for instance 175. It should be clear that the numeral value is derived from the decimal representation of the specific 8-bit word. However, the numeral 175 is merely a representation. It does not mean that a color and intensity has an actual value 175. The actual appearance of pixel [1 0 1 0 1 1 1 1] or pixel 175 or pixel Juliet depends how the representation is translated by a physical converter that converts the representation into an activation of a physical pixel. It is further noted that the name or representation that is used to name the symbol of the pixel, must be a physical signal, mark, magnetic domain, charge or any other physical phenomenon.

Often confusion arises from an anthropomorphization of computers. Computers, processors and related elements like memories and storage devices are physical devices that process signals. As such, these devices do not process symbols, but rather signals that represent symbols. Processors per se are switching devices that work generally with binary switches. Non-binary symbols, like the pixels which have more than 2 appearances or states or conditions, can effectively be represented as binary words of bits. However, they can also be represented and stored and transmitted as non-binary signal. An example of that is the QAM coding (or quadrature amplitude modulation) wherein a symbol has represented by a point of coordinate in a constellation of physical properties such as amplitude and phase. For instance QAM-16 or 16-state QAM has a constellation of 16 points in an amplitude and phase coordinates. Thus a word of 4 bits can be represented by a single QAM-16 signal.

Herein, the terms multi-state, n-state, multi-valued and n-valued symbol will mean a symbol which may assume one of 3 or more states, which distinguishes it from binary symbols or bits which can only assume one of 2 states. Furthermore, the terms state or value and multi-state or multi-valued will be used interchangeably. The logic functions that are provided herein represent the switching of states. A state may be represented by a digit or a number. This may create the impression that an actual value is attached to a state. One may, to better visualize states, assign a value to a state. However, that is not a requirement for a state. A name or designation of a state is just to indicate that it is different from states with different designations. Because some logic functions herein represent an adder the names state and value may be used meaning the same. A state defines a condition of a machine. Herein a state defines a state of a signal or its representation of a symbol as it appears at an output of a switching device and thus a state provides a condition of the switching device.

Furthermore, because of the practice in binary logic to represent a state by a physical level of a signal such as a voltage, one often assumes that different n-state signals have different levels of a signal, such as voltage or intensity. While such representations of a state are allowed it is not limited to that. A state may be represented by independent phenomena. For instance, different states of a signal may be represented by different wavelengths of an optical signal. A state may also be represented by a presence of a certain material, by a quantum-mechanical phenomenon, or by any other phenomenon that can distinguish a state from another state.

Furthermore, a symbol, which is regarded herein as a single element, may also be represented by 2 or more p-state symbols wherein p<n. For instance, a 4-state symbol may be represented by 2 binary symbols.

All operations herein take place by switching devices or machines that operate on signals. Often those signal are binary signals. However, one may process a plurality of signals as one single unit or entity. For convenience those single units will be called symbols. Depending how many different states such signals can assume, the symbol is called an n-state symbol. For instance a signal that can appear in 16 different states, such as a QAM-16 signal is called a 16-state symbol. A word of 8-bits represented by one or more signals that can appear in 256 different forms is called a 256-state signal that is represented by a 256-state symbol. For convenience such a symbol will be given a numeral, like 0-255. However, it does not limit the signal to a signal that has 256 values or intensities. It may be a 256 state QAM signal or an optical signal that can appear in 256 different wavelengths.

This is merely an example. The symbols are n-state, with at this stage no limitation to the number of states (just n>2). The logic functions can be any n-valued switching function, related to the n-state of the symbols. An n-valued function for modifying a symbol is preferably a reversible n-valued logic function. While it seems strange, one may also solve equations with non-reversible n-valued logic functions. A non-reversible n-valued logic function has a truth table with at least one row or column that has two identical output states for different input states. By providing sufficient different equations one can address the uncertainty related to the states of for instance inputs (x1, x2) and (x1, x3) generating the same output state d1.

A sequence of symbols can be arranged in a matrix to represent an image frame. This is known and is applied in for instance Matlab® representation of images. It should be clear that the symbols are usually not transmitted in a matrix.

U.S. patent application Ser. No. 11/566,725, filed on Dec. 5, 2006 entitled ERROR CORRECTING DECODING FOR CONVOLUTIONAL AND RECURSIVE SYSTEMATIC CONVOLUTIONAL ENCODED SEQUENCES, is incorporated herein in its entirety by reference. U.S. Non-provisional patent application Ser. No. 11/739,189, filed on Apr. 24, 2007, which claims the benefit of U.S. Provisional Patent Application Ser. No. 60/807,087 filed Jul. 12, 2006; U.S. Non-provisional Patent Application Ser. No. 11/743,893, filed on May 3, 2007, which claims the benefit of U.S. Provisional Patent Application Ser. No. 60/821,980 filed Aug. 10, 2006, which are all four incorporated herein by reference in their entirety.

The truth tables of sc1 and sc2 are provided in the following tables.

| sc1 | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

| sc2 | 0 | 1 | 2 | 3 |
|---|---|---|---|---|
| 0 | 0 | 1 | 2 | 3 |
| 1 | 2 | 3 | 0 | 1 |
| 2 | 3 | 2 | 1 | 0 |
| 3 | 1 | 0 | 3 | 2 |

Herein the function sc2rc is the reverse of sc2 over constant columns. Its truth table is provided in the following table.

| sc2rc | 0 | 1 | 2 | 3 |
|---|---|---|---|---|
| 0 | 0 | 3 | 1 | 2 |
| 1 | 3 | 0 | 2 | 1 |
| 2 | 1 | 2 | 0 | 3 |
| 3 | 2 | 1 | 3 | 0 |

The truth table of sc2rr is provided in the following table.

| sc2rr | 0 | 1 | 2 | 3 |
|---|---|---|---|---|
| 0 | 0 | 1 | 2 | 3 |
| 1 | 2 | 3 | 0 | 1 |
| 2 | 3 | 2 | 1 | 0 |
| 3 | 1 | 0 | 3 | 2 |

Within $GF(2^p)$ the addition is a self reversing, commutative and associative function. The truth tables of the addition and multiplier over $GF(2^3)$ are provided in the following truth tables.

| + | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 1 | 0 | 4 | 7 | 2 | 6 | 5 | 3 |
| 2 | 2 | 4 | 0 | 5 | 1 | 3 | 7 | 6 |
| 3 | 3 | 7 | 5 | 0 | 6 | 2 | 4 | 1 |
| 4 | 4 | 2 | 1 | 6 | 0 | 7 | 3 | 5 |
| 5 | 5 | 6 | 3 | 2 | 7 | 0 | 1 | 4 |
| 6 | 6 | 5 | 7 | 4 | 3 | 1 | 0 | 2 |
| 7 | 7 | 3 | 6 | 1 | 5 | 4 | 2 | 0 |

| × | 0 | 1 | 2 | 3 | 4 | 5 | 6 | 7 |
|---|---|---|---|---|---|---|---|---|
| 0 | 0 | 0 | 0 | 0 | 0 | 0 | 0 | 0 |
| 1 | 0 | 1 | 2 | 3 | 4 | 5 | 6 | 7 |
| 2 | 0 | 2 | 3 | 4 | 5 | 6 | 7 | 1 |
| 3 | 0 | 3 | 4 | 5 | 6 | 7 | 1 | 2 |
| 4 | 0 | 4 | 5 | 6 | 7 | 1 | 2 | 3 |
| 5 | 0 | 5 | 6 | 7 | 1 | 2 | 3 | 4 |
| 6 | 0 | 6 | 7 | 1 | 2 | 3 | 4 | 5 |
| 7 | 0 | 7 | 1 | 2 | 3 | 4 | 5 | 6 |

The following table shows the division rule in $GF(2^3)$.

| ÷ | 1 | 2 | 3 | 4 | 5 | 6 | 7 |
|---|---|---|---|---|---|---|---|
| × | 1 | 7 | 6 | 5 | 4 | 3 | 2 |

Or division by 2 is multiplying by 7, division by 3 is multiplying by 6, etc.

One aspect of the present invention is to partially modify a digital image or sound before distribution over a network and to create an image or sound with a disturbance or modification that allows a receiver to display the sound or image for a user at a level that allows the user to discern an essence of the content. If the user wants to enjoy the full quality of the sound or image, a de-modification program has to be obtained. This is different from known encryption or scrambling. In that case the whole image or sound is generally scrambled or made inaccessible. In that case a user cannot make an informed decision to buy a sound or an image or not. In one embodiment one may black out part of an image or sound in an irreversible way. This means that in a distribution system, the original high quality source sound or image file has to be stored for access if a user wants to purchase the sound or image. Furthermore, the entire high quality file has to be transmitted again. Clearly, it would be easier if a much smaller file can be transferred that reverses the modification. Furthermore, it is not desirable that a partially modified image or sound requires more bandwidth for transmission than the unmodified image or sound. Accordingly, the modification should preferably not increase the size of the original file of the image, video image or sound.

The apparatus or machine to modify an image, still or video or a sound is illustrated in FIG. 1. The source data comes from a camera 101 a sound source (such as a microphone) 102 a character source, such as a keyboard 103, or from a memory or storage device 110. The source information is provided to a processor 104. The data or information may be delivered in digital form or in analog form. If the information is in analog form the processor 104, with the assistance of an Analog/Digital (A/D) converter, converts the analog data into digital data. Not shown in processor 104 is a local memory and buffer to store and retrieve data including instructions. Processor 104 has at least further access to a memory or memory partition 105 with some modification instructions and a memory or memory part that determines a mask that determines the part of the data of the image or sound that needs to be modified. The processor, for instance from a header in the image or the sound file, determines that the file is an image or a video image or a sound, and the format of the file. This may include, but is not limited to coding method as to the size of the samples or pixels, frame structure, identification of a frame, number of lines in a frame, number of pixels on a line, line start and line end, frame start and frame end, and any other data that is relevant for the modification of the data. The processor, based on the type and format of the source, selects a corresponding set of instructions for partial modification and a corresponding mask. The processor 104 then partially and reversibly modifies the sound or image and stores the modified image or sound on storage or memory device 107 from where it can be retrieved, for instance on request, to be prepared for transmission in transmission device 108 to be placed on transmission channel 109 for transmission. Storage device 107 may in one embodiment be a buffer that allows real-time transmission. In one embodiment of the present invention, the image and/or sound are generated and processed in real-time or with a minimal delay caused by processing steps. For instance, sound and images are taken from a live concert or from a sports game and partially modified in real-time.

In the real-time case a video image frame is numbered in a modulo manner. For instance in a modulo-k manner, wherein k is the number of frames per second. The modification of pixels and id so desired the mask may change per frame and repeat after k frames. The modification is associated and synchronized with a frame ID. At the receiving end the reversing steps, which will be explained below, are also associated or synchronized with the frame numbers and frame IDs and allows for correct reversal if there is access to the reversing data, which may be acquired against payment from a server.

Figure 2:
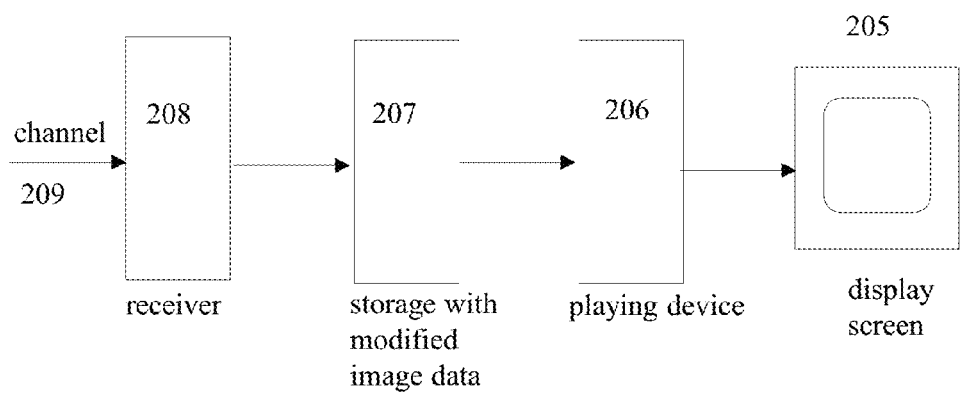

FIG. 2 illustrates the apparatus with components ate the receiving side. The transmission channel 209 provides data of the modified image or sound as signals into receiver 208, which demodulates the signals into a format that can be processed and is stored in a storage, memory or buffer device 207 which is provided to playing device 206 which provides the signals to display device 205. Accordingly, playing device 205 plays a partially modified image or sound.

Figure 3:
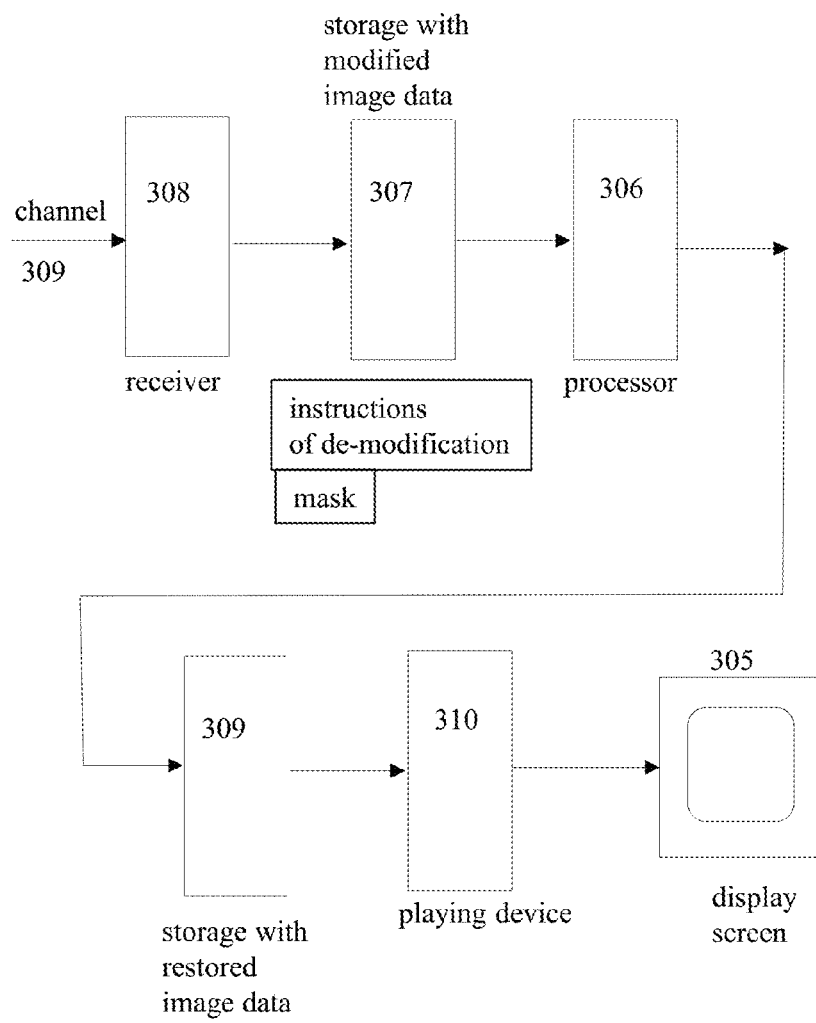

FIG. 3 illustrates an apparatus that de-modifies the received image or sound. A channel 309 delivers the signals from a server that represent the partially modified image or sound. The receiver demodulates the signals and stores the modified image or sound in memory or storage 307. In the same memory, or in a separate memory the instructions for de-modifications and the de-modification mask (which is identical to the modification mask) is also stored for retrieval. A processor 306 applies the instructions for de-modification and the mask on the modified image or sound and stores the de-modified image or sound in a memory, storage device or buffer memory 309, from which is retrieved by a playing device 310 which processes the data to be displayed on displaying device 305 which may be a display screen or a loudspeaker.

While the devices of FIG. 2 and FIG. 3 have similar processors, the stored data makes the apparatus of FIG. 3 different from the apparatus of FIG. 2. The apparatus of FIG. 2 can only display the partially modified image or sound, while the device of FIG. 3 displays a high quality unmodified image or sound.

Figure 4:
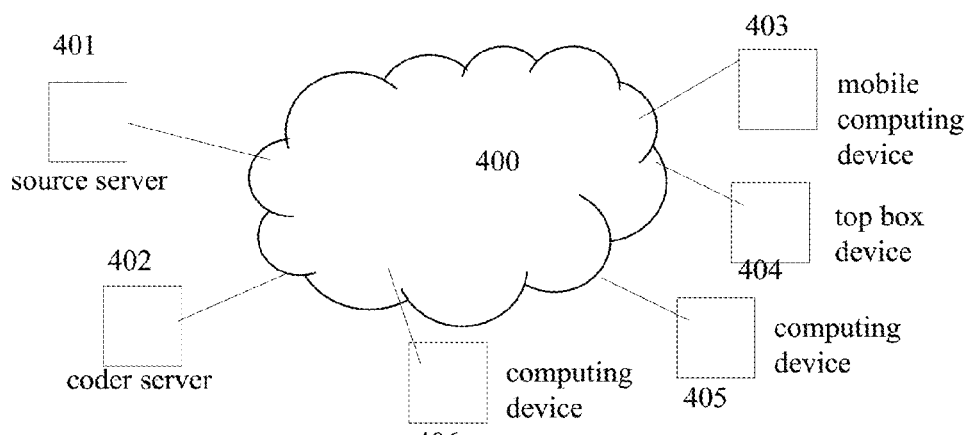

FIG. 4 illustrates a network that transmits signals between devices. A network 400 (the cloud) is provided which in an internet or the Internet and provides a plurality of networks. Network 400 includes wireless, wired, switched and direct connections. It allows connection and data transfer between all connected devices. The network 400 may work under one protocol, but preferably under a series of different protocols, such as known for the Internet. The devices may be connected with the cloud through fixed connected or dialed connections, as a cell phone connection, as a WiFi connection, as a cable Internet connection, as a Bluetooth or other micro connection, as a cable tv or top box connection or any other connections that can connect computing devices to exchange data.

The source of the modified image or sound, being it stored or generated in real-time, can be from any computing device attached to a network to any other computing device on the network. For instance from a computing device 406 to a mobile computing device 403 or to a computing device 405. In one embodiment of the present invention the modification to an image or sound is applied to a streaming signal from a server 401 connected to network 400. The server 401 may modify the image or sound file or may subscribe to a server 402 which modifies an unmodified image or sound and then streams it over the network to connected devices such as a mobile computing device 403, a top box device 404 or computing devices 405 or 406. These devices can request or connect to the streaming signal by signing on to a Universal Resource Locator (URL). De-modifying instructions and mask are requested for instance server 402 and are made available either by authentication of the requesting device or by accepting a payment.

Authenticated devices are automatically provided with the required demodifying instructions, which is simple in the case of a pre-recorded and then modified image or sound file. prior to transferring or streaming an image or sound the demodifying information is transmitted and installed on the receiving device. This is not possible in the case of real-time streams because the data has to be streamed as soon as possible after the signal is recorded by a camera or a microphone. There are different ways to address this issue. In a first embodiment of the present invention, a scheme for modifying is selected. For instance a modification scheme for 10 minutes of image or sound data is provided. This determines automatically the required demodification. Demodification applies the same mask as modification and instructions that are the reverse of the modification instructions. Because some delay can occur during transmission, including due to congestion and buffering an installed demodification program may be uncertain about correct synchronization. It may be assumed, as explained further down below, that the modification of an image frame in a video or a sound signal changes over time. That is, either the modification rules or the mask or both change over time. This means that if the demodification is not correctly aligned or synchronized in mask and instructions with the actual image frame or sound sample position then the demodification will fail and further modification will take place.

In one embodiment of the present invention frame numbers are embedded in the image data or coding of the image frame. In one embodiment of the present invention a frame structure is created for sound samples. A sound frame then covers a certain tome of sound play, for instance 1 sec., 5 sec., 30 sec., 30 sec. or any time that is useful. A frame ID or frame number is provided and embedded with every frame, be it a video image frame or a sound frame. In many cases the sound is synchronized with the video image. In that case the video frame ID may also be used to ID a corresponding sound frame.

In one embodiment of the present invention the modification takes place on a computing device that contains a camera, such as a smartphone. The processor on the smartphone has access to a modification mask and the modification instructions. During recording of a video image a user of the smartphone selectively activates the image (and/or if desired the sound) modification. The generated result is a first signal or file containing the modified video image, still image and/or sound and a file that contains the synchronized de-modification mask and instructions. Both the modified image and/or sound are transmitted to another device if it is desired that the image/sound to be played in the original quality. Only the modified image/sound is transmitted in the alternative if it is desired that only the modified image/sound is to be played.

Figure 5:
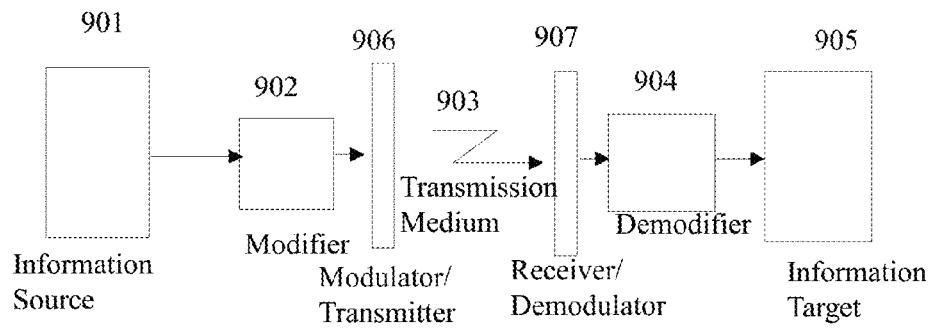
Figure 6:
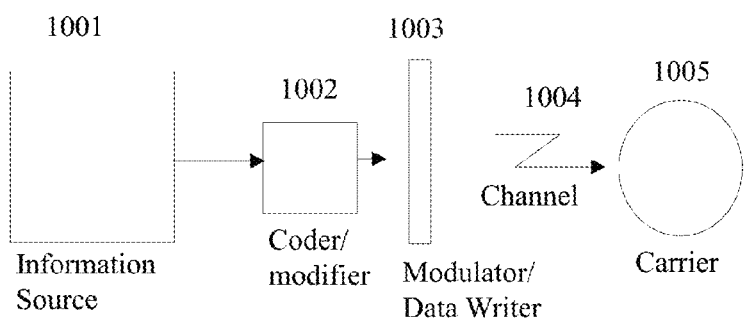

The herein provided apparatus and methods for image and/or sound modification are to be used in a system, such as a communication system or a data storage system. A data storage system may be a memory, a magnetic disk, an optical disk flash memory or any other system wherein data can be stored and retrieved from over a longer period, but at least a period of 2 hours and preferably in the order s of days, weeks, months and even years. The modification can be applied to provide some protection of security, without making the files meaningless for viewing without the correct de-modification. One should then store the de-modification in a secure manner that is accessible but not in such a manner that de-modification does not take any additional effort. A communication system may be a wired system or a wireless system. Such a system may be used for data transmission, telephony, video or any other type of transfer of information. A diagram of such a system is provided in FIG. 5. Herein 901 is a source of information. The information is provided to a partial modifier 902. The information provided to a modifier 902 may already be in a digital form. It may also be converted into digital form by the modifier 902. The modifier 902 creates the partially modified images, sounds or text symbols as described herein as another aspect of the present invention. The thus created signals may be provided directly to a transmission medium 903 for transmission. They may also be provided to a modulator/transmitter 906 that will modify the signals provided by 902 to a form that is appropriate for the medium 903. For instance, 906 may create an optical signal, which may be written on an optical disk, or provided to a transmission medium such as an optical fiber. Modulator 906 may also be a radio transmitter, which will modulate the signal on for instance a carrier signal, and wherein 903 is a radio connection. Not specifically shown, but assumed, is circuitry as known to one of ordinary skill in the art to provide and insert "housekeeping" signals, which may include synchronization signals or other signals to assist a receiver to receive, demodulate, decode and display a signal.

At the receiving side a receiver 907 receives and/or amplifies and/or demodulates the signal coming from 903 and provides a digital signal to a demodifier 904. The demodifier 904 based on de-modification instructions and the corresponding mask demodifies the modifies image, sound and/or text symbol. A demodified signal is then provided to a target 905 which may be a display device, such as a radio, a phone, a computer, a tv set, as display screen, a printer, a memory, a storage device or any other device that can be a target for an information signal. A modifier 902 may also provide additional coding means, for instance to form a concatenated or combined code. In that case, the demodifier 904 has equivalent means to decode the additional coding. Additional information, such as synchronization, frame or ID information, may be inserted during the transmission and/or coding process.

In accordance with another aspect of the present invention, the here provided methods and apparatus for modification and demodification of signals can also be applied for systems and apparatus for storage of information. For instance, data stored on a CD, a DVD, a magnetic tape or disk or in mass memory in general may benefit from security provided by partial modification. A system for storing modified signals in accordance with another aspect of the present invention is shown in diagram in FIG. 10. A source 1001 provides the information to be modified. This may be audio, video or any information data. Unit 1002 creates and may code the signals provided by 1001. Unit 1002 may also first digitize analog signals. The thus created partially modified data symbols may be provided directly to a channel 1004 for transmission to an information carrier 1005. In general, a modulator/data writer 1003 will be required to write a signal to a carrier 1005. For instance the channel requires optical signals or it may require magnetic or electro-magnetic or electro-optical signals. Modulator/data writer 1003 will create a signal that can be written via channel 1004 to a carrier 1005. Important additional information such as for ID and/or synchronization may be added to the data.

Accordingly, apparatus and methods for error detection and error correction as provided herein may be part of an audio player, a video player, a communication device, a storage device or any other device or system that may benefit from correction of errors in a signal. For instance it may be part or implemented in a mobile computing device such as a mobile phone or a personal digital assistant (PDA). It may also be part of a computer. It may also be part of any computing device that is enabled to receive and exchange data, either through a network or via a storage medium. A storage medium may be an optical disk, a magnetic disk or an electronic medium. Such media may store image, sound and/or text data as binary symbols or marks and store n-state coded symbols such as pixels as binary words such as bytes. It may also store n-state symbols as multi-state symbols or marks, each symbol or mark having one of 3 or more states. A computing device implementing one or more of the methods and/or n-state expressions may be connected to a network. Such a network may be a wired or a wireless network. The network may be the Internet. It may also be a single connection to another apparatus. Communication may take place with binary symbols, analog signals or signals being a multi-state symbol having one of 3 or more states, such as 16-QAM signals or any other signal that can have one of 3 or more states. A signal may be an electronic signal, a radio signal, an optical signal, an acoustical signal, a mechanical signal, a quantum mechanical signal, a chemical or bio-chemical signal that is able to transmit a symbol having one of 3 or more states.

Figure 7:
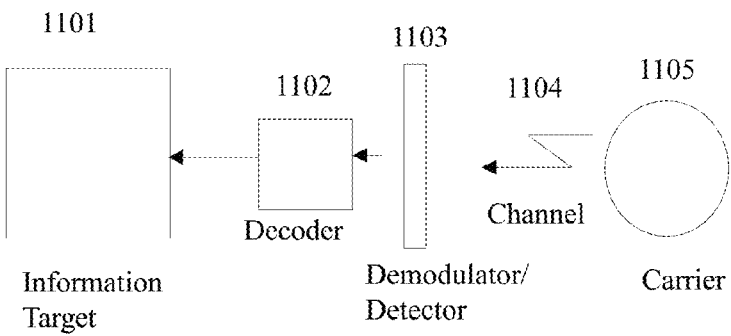

FIG. 7 shows a diagram for demodification of information read from a carrier 1105. The information is read through a channel 1104 (such as an optical channel or magnetic or electro-magnetic or electro-optical) and provided in general to a detector 1103 that will receive and may amplify and or demodulate the signal. The signal is provided to a decoder/demodifier 1102 where decoding and demodification takes place. The information signal, possibly readied for presentation as an audio or video signal or any other form, is then provided to a target. The target may be a display screen, a video screen, a computer, a radio, a loudspeaker a printer or any other device that can apply the demodified signal.

Not shown, but assumed, in all applications may be circuitry that performs housekeeping tasks such as synchronization, equalization, amplification, filtering, D/A and A/D conversion and the like to facilitate the processing of a signal.

The methods of modification and demodification can be implemented in accordance with an aspect of the present invention in an apparatus that can perform the steps of the methods. The implementation can take place in a program with instructions that can be stored in a memory and that can be retrieved by a processor for execution. One may also implement the methods in accordance with an aspect of the present invention in dedicated hardware that will perform the steps of the methods. Such hardware may comprise custom designed circuitry. Such circuitry may be n-state circuitry that implements at least one of the n-state switching functions that is used in either determining a check symbol or to detect or to correct a symbol in error. Such hardware may also comprise programmable units that can be programmed to perform a certain function such as Field Programmable Gate Arrays. Instructions may also be implemented in binary logic circuitry, combined with Analog/Digital conversion circuitry to convert an n-state signal into a binary signal; or with Digital/Analog converter circuitry to convert a binary signal into an n-state signal.

One may represent an n-state symbol such as a pixel or a sound sample or a text character by an n-state signal with n>2. Such an n-state signal may be an n-level signal, wherein a state may be represented by one of n voltage levels or intensity levels with n greater than 2. One may also represent an n-state symbol with a signal that can assume one of n states which are linear independent, so that linear addition of 2 or more n-state signals will not create another n-state signal with n greater than 2. One may also represent an n-state symbol by a plurality of p-state symbols with p<n. One may also consider a plurality of binary signals to represent an n-state symbol. One may process an n-state symbol by a processor implementing an n-state switching function which may be represented by at least an n by n truth table. One may also process a plurality of binary signals as representing an n-state symbol by a binary processor, wherein the binary processor processes the plurality of binary symbols by a binary implementation of an n-state logic function in binary form and wherein the n-state logic function can be represented by at least an n-by-n truth table with n>2.

As an example one may process a plurality of binary signals as if 3 binary signals represent for instance an 8-state symbol. One may then process binary words wherein each word is formed by 3 bits by an implementation of an 8-state switching function. Such a function may be for instance the following function sc8 which is provided in 8-state notation and in binary notation as sc8b.

| sc8b | 000 | 001 | 010 | 011 | 100 | 101 | 110 | 111 |
|---|---|---|---|---|---|---|---|---|
| 000 | 000 | 001 | 010 | 011 | 100 | 101 | 110 | 111 |
| 001 | 001 | 000 | 011 | 010 | 101 | 100 | 111 | 110 |
| 010 | 010 | 011 | 000 | 001 | 110 | 111 | 100 | 101 |
| 011 | 011 | 010 | 001 | 000 | 111 | 110 | 101 | 100 |
| 100 | 100 | 101 | 110 | 111 | 000 | 001 | 010 | 011 |
| 101 | 101 | 100 | 111 | 110 | 001 | 000 | 011 | 010 |
| 110 | 110 | 111 | 100 | 101 | 010 | 011 | 000 | 001 |
| 111 | 111 | 110 | 101 | 100 | 011 | 010 | 001 | 000 |

| sc8 | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 1 | 0 | 3 | 2 | 5 | 4 | 7 | 6 |
| 2 | 2 | 3 | 0 | 1 | 6 | 7 | 4 | 5 |
| 3 | 3 | 2 | 1 | 0 | 7 | 6 | 5 | 4 |
| 4 | 4 | 5 | 6 | 7 | 0 | 1 | 2 | 3 |
| 5 | 5 | 4 | 7 | 6 | 1 | 0 | 3 | 2 |
| 6 | 6 | 7 | 4 | 5 | 2 | 3 | 0 | 1 |
| 7 | 7 | 6 | 5 | 4 | 3 | 2 | 1 | 0 |

Figure 8:
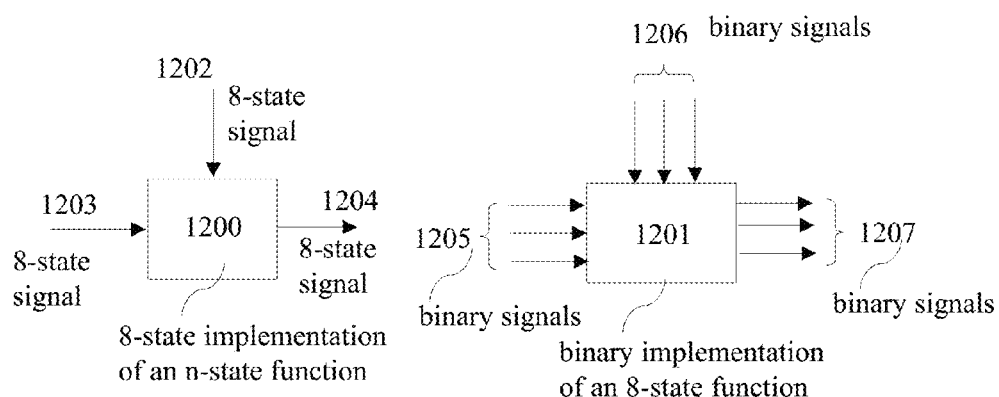
FIGS. 8 and 9 illustrate an implementation of an n-state truth table.

FIG. 8 shows an n-state implementation 1200, for instance on a addressable memory, wherein input values combined form the address of a memory content, of function sc8, having an input 1202 and 1203, each enabled to receive an 8-state signal and an output 1204 that can provide an 8-state signal in accordance with the truth table of sc8. The implementation of the function sc8 may be based on components as disclosed in U.S. Pat. No. 7,218,144 issued on May 15, 2007, or with U.S. patent application Ser. No. 11/964,507 filed on Dec. 26, 2007, which are both incorporated herein by reference in their entirety. FIG. 8 also shows a binary implementation of the truth table sc8b, which is equivalent to sc8. An 8-state symbol herein may be provided as a word of 3 parallel bits on a set of 3 inputs 1205 and 1206. An 8-state symbol is then provided in accordance with the truth table of sc8b on the set of 3 outputs 1207. The binary implementation of sc8b can be 3 parallel devices implementing an XOR function. One can easily check that the output word of sc8b is created by taken the XOR of the 3 bits of a first word provided on input 1205 with the 3 bits of binary word provided on 1206.

Figure 9:
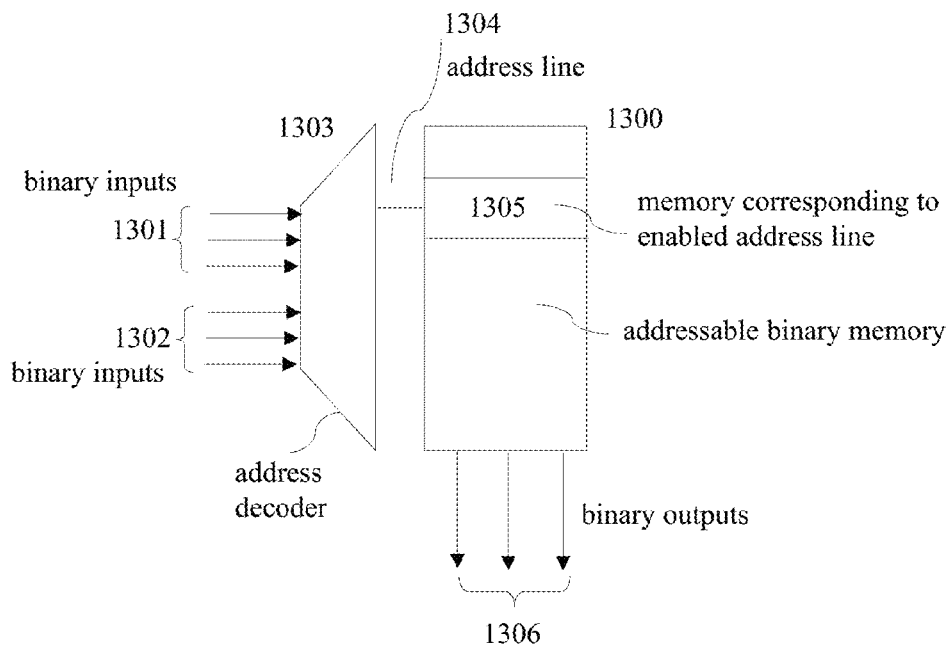

A further possible implementation of the truth table of sc8b is shown in FIG. 9, wherein an addressable binary storage memory 1300 is used. It applies an address decoder 1303, which is provided on 2 sets of 3 inputs 1301 and 1302 with 2 binary words of 3 bits. Based on the inputted 6 bits the address decoder enables a corresponding address line 1304, which enables the reading of a content of a memory 1305. This content is provided on the output set 1306 of 3 outputs. The relation between the input address and the binary output of the device of FIG. 9 is provided by the truth table of sc83.

In accordance with a further aspect of the present invention all multi-state symbols may be represented and processed in binary form as a plurality of binary symbols. It should be clear that in such a situation one should apply means to synchronize all symbols in accordance with the symbols they represent. One may also use multi-state symbols during part of a process and binary or other representation and processing during a different stage of processing. As an example it is known to use multi-state symbols for transmission of symbols. One may, if so desired, prepare and process the multi-state symbols in for instance binary form before actual transmission.

Presently discussions take around what a generic computing device is. A generic computing device herein is a programmable computing device that performs instructions which combined are known steps. However, as soon as a processor in a computing device is programmed to preform steps that are not presently known or conventional and/or the processor actually execute the instructions and performs the steps that are presently unknown, then the computing device stops being a generic computing device, but becomes a customized and dedicated machine. This is exemplified in the design and implementation of arithmetical circuitry. For instance a computing device that executes a sum (A+B) may be considered a machine that performs a conventional idea, being an addition. However, people appear to have forgotten that machines really do not add. In fact the problems that inventors have to go through to invent and construct a switching machine that actually performs arithmetic by electronic or any other physical switching has been numerous and well documented. For instance an adder is a machine that has very specific unique circuit properties. Different adder designs are known, such as the simple ripple adders, carry-save and carry predict adders and so on. These designs attack real-life switching issues that are not mere abstract ideas. There is significant art that describes physical and structural issues related to computing machines. One such article is "8. Design of Adders, by J. A. Abraham, Sep. 21, 2011, Department of Electrical and Computer Engineering, the University of Texas at Austin" downloaded from <URLwww.cerc.utexas.edu/~jaa/vlsi/lectures/8-1.pdf> and the content of which is incorporated herein by reference. It clearly demonstrates how the arrangement of logic functions, which represent specific physical switching circuits, characterized by switching tables, determines a performance, such as speed, of a device that switches signals in a manner that corresponds to human addition. However, the circuits as such do not add, they do not know that they add, they merely switch signals through a series of physical devices. What makes the device a non-abstract very real device is the specific arrangement of individual circuits and the order in which they switch.

In the same sense devices that perform the modification and demodification steps of the present invention are switching devices that have as an input an image represented as discrete image data or other data samples that are really signals. The signals are modified by switching devices, characterized by non-binary switching tables that by themselves are unconventional, to generate on a display a partially modified image that allows viewing but at a reduced quality. The apparatus that achieves that result is a physical device that processes signals. There is no human that can perform this task. The machine is a dedicated physical switching machine that processes input signals to generate and then display modified output signals. Even more unconventional are the devices that perform the modification.

The inventor has recognized that a pixel of an image, a sample of a sound or a character in a text is a signal entity or signal set that is generated, processed, transmitted, received and processed again with circuits, such as electronic circuits, as a unit. A pixel, a sound sample or a character, which each may be represented by a plurality of bits, may be considered as a non-binary or n-state symbol. A symbol is a name or a representation for something. That something in the present invention is a pixel, a sound sample or a text character. The system or systems as provided herein in accordance with various aspects of the present invention are described herein as processing symbols or n-state symbols. Each symbol or n-state symbol is in fact a representation of a signal or a plurality of signals. An 8-bit pixel can be represented by a 256-state symbol, being a numeral a plurality of numerals or names that can appear in 256 different forms. In numeral form, an 8-bit pixel may be represented by numerals ranging from 0 to 255. However one may also make up 256 different names starting with first name Anneliese and ending with $256^{th}$ name Noah and 254 names in between. This does not change anything to the fact that the symbol is merely a representation of 8-bits. The 8-bits by themselves form a digital word of 8 bits. The order of the bits is important as it determines the state of the word. The word [1 1 1 1 0 0 0 0] is different from the word [0 0 0 0 1 1 1 1]. The word is a representation of for instance 8 signals that each has one of 2 states. A state of a signal indicates that each state represents a different signal. For instance a binary or 2-state signal may be on (4 Volt) or Off (ground). The name given to a binary signal thus indicates that the signal can appear in two appearances. The names or values 0 and 1 commonly provided in the literature have nothing to do with the actual value of the signals, which may be -2 Volt and 2 Volt or a signal of 500 Hz and a signal of 600 Hz. This may be compared with signals generated from a keypad of a push button phone, the DTMF (dual-tone multi-frequency signaling) as an in-band signaling device. While each key determines a symbol (0, 1, 2, 3, . . . 9, * and #) the actual signals generated by each key is a combination of two frequency signals. For instance the number 1 key is represented by a combination of a 1209 Hz and 697 Hz signals and not by a signal with value 1. All the concepts of symbols and logic tables thus herein represent actual devices and actual signals.

Furthermore, switching devices operate on discrete signals. Commonly on binary signals. However, combination of binary signals in one embodiment of the present invention form an n-state symbol that is processed as an n-state signal. The fact that a signal is represented by its digital value and processed in that form does not mean that the processing is an abstract idea. The representation of an image, sound or character in its digital form by discrete signals and processing of these values is an engineering science that is well documented in textbooks related to digital signal processing (DSP) or digital image processing (DIP). DSP and DIP require physical conversion (such as A/D and D/A conversion) and constraints (including the Nyquist criterion, causality, etc) that set the physical limitations of the processing.

The inventor of the instant application is aware of the physical limitations of switching devices and the size or variety of signals that are being processed. For instance a pixel or sound sample that is 256-state (or represented by an 8-bit byte or transmitted by a 256-state signal or composite signal) can be processed by a 256-state switching device. A switching device that implements or realizes a 256-state switching table, in one embodiment of the present invention is a memory with 256 by 256 storage elements that is addressed by two 256 state signals. The output of such a device is the signal determined by the content of the addressed memory location. A 256 state truth table would require a $2^{16}$ 8-bits memory or 64 K bytes. In present dat technology that is not an exceptional requirement. Commonly, a color pixel can be a 24-bits word. A 24-bits word has over 16 million states. A memory for a 24-bits by 24-bits truth table would be extremely large in terms of required memory space.

However, aspects of the present invention require modification (preferably reversible modification) of a pixel or a sample or a character. Accordingly, it would be acceptable and efficient to modify only part of a pixel. For instance, one may consider a pixel a 24-bit or over 6 million state symbols, which is comprised of 3 8-bits or 256-state symbols or signals. If it is acceptable to realize one or more 256-state switching tables, the machine selects a subset of 8 bits in a pixel of 24 bits and considers and modifies these 8 bits as a 256 state symbol and modifies or processes it as a 256-state symbol. The 8 bits may be selected as a consecutive set of bits or in any other way that selects 8 bits from the 24 bit. In accordance with an aspect of the present invention a k-state symbol and a p-state symbol is created from an n-state symbol with k<n and p<n and the k-state symbol is processed by a device implementing a k-state switching table. A new modified n-state symbol is created from the modified k-state symbol and the p-state symbol. In one embodiment of the present invention the p-state symbol is modified by a p-state switching device into a new p-state symbol.

Figure 10:
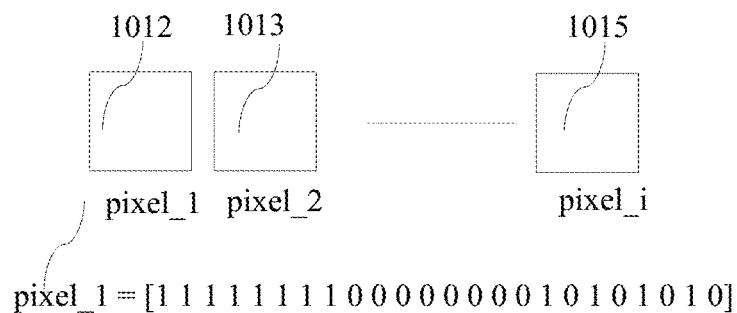
FIGS. 10, 11, 12, and 13 illustrate pixels that are modified in accordance with one or more aspects of the present invention.
Figure 11:
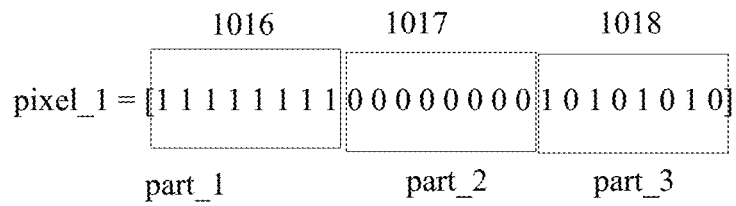
Figure 12:
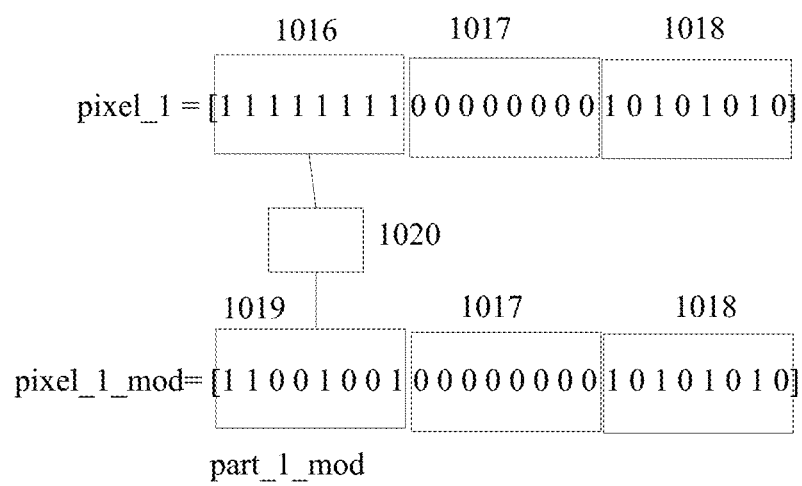

Aspects of these modification steps are illustrates in FIGS. 10-13. It is to be understood that for illustrative purposes a pixel is represented by a 24-bit word. However, different types of representations are possible and are known and are fully contemplated. The aspects as illustrated in FIGS. 10-13 relate to processing of pixels and sound samples in binary form by a processor. The transmission of the pixels and sound sample representations can take place in binary form or non-binary line coding such as QAM-16, QAM-64 or QAM-256 are known. FIG. 10 illustrates a line of pixels 1012, 1013 to 1015, each represented as a 24-bit word, which can be considered to be 3 consecutive words of 8 bits, illustrated in FIGS. 11 as 1016, 1017 and 1018. So far nothing has happened to the pixel representation. FIG. 12 illustrates one modification applied in accordance with an aspect of the present invention. For instance the first 8-bits part 1016 is modified by a modifying device 1020 in a reversible way into a new part 1019 which replaces part 1016. So there still is a 24-bits word, but the first 8-bits word has been reversibly modified. This means that pixel_1 has been reversibly modified into a pixel pixel_1_mod which will be different from pixel_1. The modified pixels will thus create a modified image. A mask will determine which pixels will be modified and pre-defined 256-state functions, represented by 8-bits words, will define how modification takes place.

Figure 13:
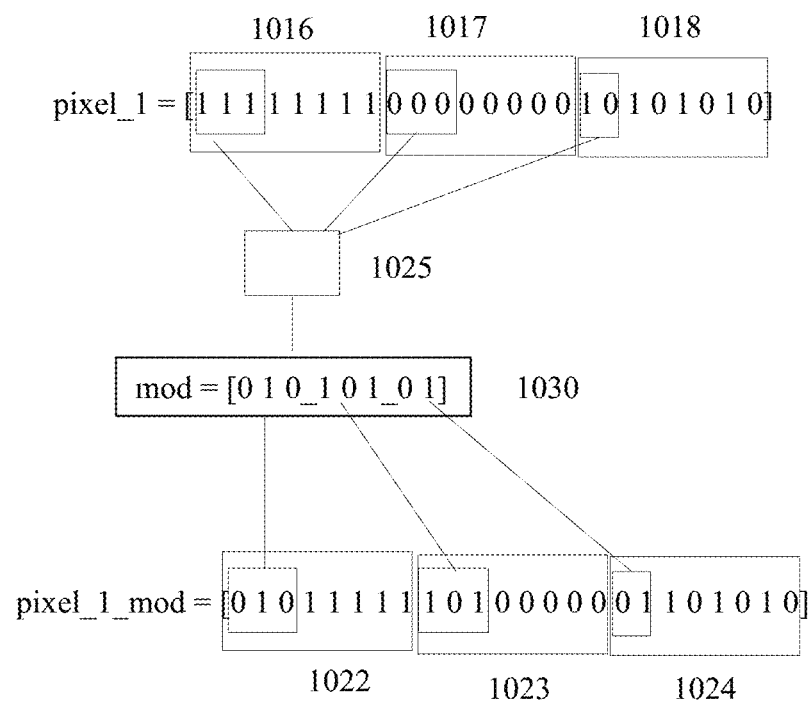

FIG. 13 illustrates another way to modify a 24-bit pixel selected for modification, using again pixel_1 with 8-bits parts 1016, 1017 and 1018. However, a processor is now instructed to select the first 3 bits of part 1016, the first 3 bits of part 1017 and the first 2 bits of part 1018 to create an 8-bits input to reversibly modifying device 1025 to create a modified 8-bits word "mod" 1030. The processor redistributes the 8 bits in a corresponding manner back into a pixel_1_mod representation. Assuming that the first bits of 8 bits parts 1022, 1023 and 1024 are the most significant bits, then the modified pixel is completely modified in all components.

An n-state modifying device can be represented by an n by n matrix that is called the switching table. This can be implemented in a memory device as illustrated in FIG. 9. This is a two-input device that requires two inputs. In some cases it may be simpler to use n-state inverters. An n-state or n-valued logic has n! reversible inverters. This concept is for instance explained in U.S. Pat. No. 7,782,089 issued on Aug. 24, 2010 to Lablans which is incorporated herein by reference. One way to implement an n-state inverter is by way of a memory. The processor first selects, based on an instruction, which n-state inverter is to be used and then is applied to modify, in the illustrative case, an 8-bit word. One may create a limited collection of 256-state inverters, for instance 100. Each 256-state inverter requires 256*8 bits or 256 bytes. A to be modified 8-bit word is then the address to the selected memory table and the content at the memory address is the new 8-bit word. A collection of 100 256-state inverters requires 25,600 bytes which is not a burden on present technology. The 100 reversing inverters are implemented on a memory at the receiving demodifying equipment.

In a first embodiment one may introduce errors in data symbols after check symbols have been calculated. If the errors are detectable and correctable, a receiver with the appropriate error correcting apparatus may correct the errors, providing a full quality signal. In another embodiment one may withhold the error correction means from a receiver. By placing errors in data symbols that are not correctible one may create a deteriorated signal that still has sufficient quality, but a lower quality than what is optimally possible. A user may for instance purchase the appropriate error correction means, in either downloadable code via a network, or on a storage medium and install it on a processor in a receiver so that all introduced errors can be corrected, thus providing an optimal quality signal.

In one aspect of the present invention two or more sets of two or more n-state equations having two or more unknowns have to be resolved, for instance as it relates to solving errors in two or more rows or two or more columns of a matrix having at least two dimensions. One may solve the set of equations serially. In many cases there is a time constraint of the solving of errors, for instance in real time display of signals such as digital video signals. The time available for solving errors is then determined by the constraints imposed by the Nyquist-Shannon sampling theorem. In such a case it may be beneficial to have a separate and/or dedicated processor for solving a set of equations to solve one or more unknowns in a row or a column of n-state data symbols. Each set of equations is thus solved in parallel to others by a processor that implements at least one n-state logic function defined by at least an n by n truth table.

As stated above a processor may be a general processor or a Digital Signal Processor (DSP). A processor may also be dedicated hardware that is hardwired to execute the steps or instructions that are aspects of the present invention. Retrieving instructions thus may mean retrieving instructions from a memory and for instance to be put in an instruction register of a processor to be executed. Retrieving instructions in a hard-wired circuit, in the context of this application, may mean starting execution at a first circuit and forcing signals to go through a pre-determined series of circuits. The memory is thus a hardwired memory (hardwired by connections in and/or between circuits) and retrieving and executing an instruction is moving of a signal from a previous circuit to a next circuit as is determined by the connections.

As described above, a sequence of n-state symbols, divided in blocks of a plurality of n-state symbols, signal is intentionally corrupted by modifying, in a reversible manner, at least one n-state symbol by applying an n-state switching function, which is preferably a reversible n-state switching function. A solution how to reverse the intentionally corrupted n-state symbols is in one embodiment of the present invention provided separately from the sequence of n-state symbols. Without such a solution one only has access to the corrupted sequence.

Preferably, the sequence is part of or constitutes a file such as an audio-file, a picture file, an image file, an audio-visual file or any file that can be received and displayed as an audio signal for instance through a loudspeaker or as a visual signal displayed on a display or an audio-visual file. The file may also be a data file, such as a financial file, or any other data file.

As described above, a sequence of n-state symbols, divided in blocks of a plurality of n-state symbols, signal is intentionally corrupted by modifying, in a reversible manner, at least one n-state symbol by applying an n-state switching function, which is preferably a reversible n-state switching function. A solution how to reverse the intentionally corrupted n-state symbols is in one embodiment of the present invention provided separately from the sequence of n-state symbols. Without such a solution one only has access to the corrupted sequence.

The term corrupted is applied herein. It is intended to mean modified. A sequence of symbols is to be corrupted or modified, if no further details are provided. In accordance with an aspect of the present invention, different manners or embodiments of corruption or modification are provided. In a first embodiment of the present invention there is random appearing corruption or modification. That is, it appears that a symbol in a sequence of symbols is apparently randomly modified. Or in other terms, a distribution of modified symbols in a sequence of symbols, which appears to have a level of coherence, appears to be random. The term random herein, is intended to mean pseudo-random or random-like, without further specification. However, true random modifications, based on an unrepeatable process are also provided herein, but should be specifically be identified. A pseudo-random process herein is assumed to be repeatable.

In a further embodiment of the present invention, a modification of a sequence of symbols is at least partially non-random or deterministic. This means that a block of symbols in the sequence of symbols is modified beyond a number of symbols determined by a pseudo-random mask. Such a block may form a plurality of samples in a digital representation of an audio signals or a block of pixels in an image or a plurality of symbols in a text or data file that is modified or corrupted.

In a further embodiment of the present invention a corruption or modification is reversible. In yet a further embodiment of the present invention a modification or corruption is irreversible in a deterministic sense. Modifying a corrupted symbol to its original state is called de-corruption herein. Corruption and decorruption are deliberate processes and are different from signal degradation due to noise or other environmental effects.

In yet a further embodiment of the present invention a majority of the symbols in a sequence of symbols is modified or corrupted. In yet a further embodiment of the present invention a minority of the symbols in a sequence of symbols is modified or corrupted. A sequence of symbols in the directly above description forms a recognizable composition, such as an image, a frame in a video, a sentence in a paragraph, a segment of an audio file, etc.

Preferably, the sequence is part of or constitutes a file such as an audio-file, a picture file, an image file, an audio-visual file or any file that can be received and displayed as an audio signal for instance through a loudspeaker or as a visual signal displayed on a display or an audio-visual file. The file may also be a data file, such as a financial file, or any other data file.

Figure 14:
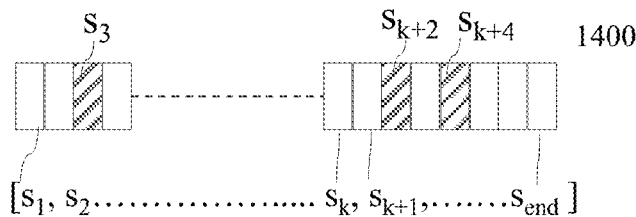
FIGS. 14 and 15 illustrate a sequence of symbols with designated corrupted locations in accordance with one or more aspects of the present invention.

A sequence of n-state symbols is illustrated in FIG. 14. Herein, n is in one embodiment 2 or greater. Accordingly, in that case a symbol is a binary symbol or a non-binary symbol. In another embodiment n is greater than 2. Accordingly, in that case a symbol is a non-binary symbol. One is reminded that a non-binary symbol can be formed by a plurality of lower radix symbols. For instance an 8-state symbol can be represented by 3 binary symbols or by 2 5-state symbols. FIG. 14 illustrates a sequence 1400 [$s_1$, $s_2$, ..., $s_k$, $s_{k+1}$, $s_{end}$]. Herein, each rectangle $s_i$ represents an n-state symbol. The n-state symbols are ordered in a position relative to each other. Thus, the n-state symbols can be represented as a serial sequence of n-state symbols.

In one embodiment of the present invention, the relative position of n-state symbols in a sequence is only presented for illustrative purposes as a serial sequence, and represents for instance an order of processing of the n-state symbols. For instance $s_1$ is processed first and $s_{end}$ is processed last by a processor. The n-state symbols may be transmitted and stored in a different order, if that is convenient. However, the processing takes place in a specific order, for instance as indicated in FIG. 14.

For specified or unspecified reasons it is desirable to modify part of the sequence in a reversible way. However, modification or corruption in an irreversible way is also provided herein in accordance with an aspect of the present invention. As a result, when the content represented by the sequence, which may be digital audio, video, audio-visual, text or otherwise usable or playable data, can only partly be displayed, listened to or correctly viewed or used. This may be applied for encryption purposes. The partial corruption may also be applied to provide a potential user or buyer a "taste" of the content of the data captured by the uncorrupted sequence.

In general, files like video files can be quite large and to modify only parts of a video frame, so that the modification is reversible, preferably with a random-like appearance and still leaves an intelligible image to evaluate is not simple. If the modification is to be reversible, one would preferably reverse the corruption in real-time, as the signal is being played. Real-time is intended to be interpreted by one of ordinary skill as being within the confines or limitations of the known Nyquist sampling theorem. That means that in real-time a first sample of a signal is being processed completely before the processing of the next sample is due while the processed samples provide a seemingly uninterrupted display.

In some cases real-time processing may not be required. For instance a file or part of a file is processed in its entirety before it is displayed.

FIG. 14 illustrates a sequence of symbols 1400. For illustrative purposes symbols $s_3$, $s_{k+2}$ and $s_{k+4}$ are to be modified, either in a reversible way or in a non-reversible way. One of ordinary skill would realize that most "useful" sequences of symbols, be it binary or non-binary, contain, what one may call, housekeeping symbols, or a structure that maintains a certain way of display. In that regard, one can recognize "content" symbols and "housekeeping" symbols in a sequence of symbols. In accordance with one embodiment of the invention, corruption of data is performed on the content symbols of a sequence and not on the housekeeping symbols. Housekeeping symbols are symbols that determine, for instance an end-of-file, an end of a frame line, synchronization symbols, identification symbols and the like. Corruption of these symbols may render a sequence unplayable in its entirety which may not the purpose in at least one embodiment of the present invention.

In one embodiment of the present invention, a symbol is corrupted in a sequence which is structured into codewords of multiple symbols. As described above a method to correct these intentional corrupted is provided to a receiving processor separate from the sequence.

Figure 15:
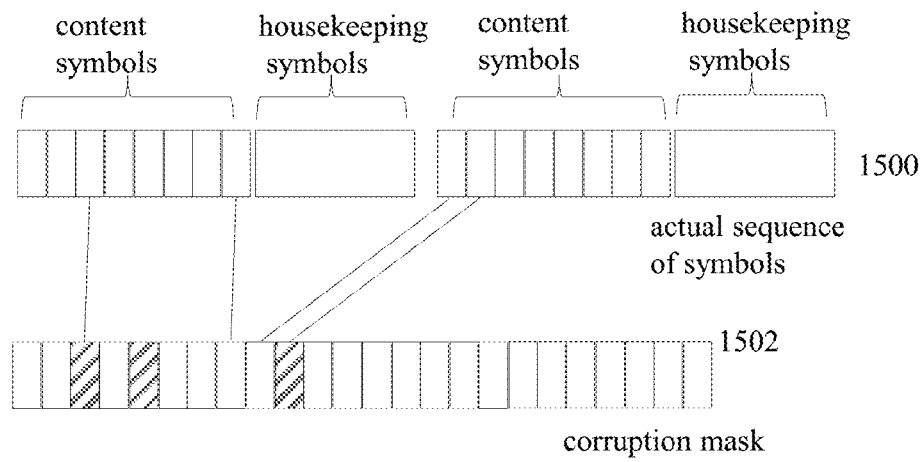

FIG. 15 illustrates how a sequence of symbols can be intentionally corrupted by applying a corruption mask. An actual sequence of symbols, which may be binary symbols or non-binary symbols, contains at least content symbols. The sequence of symbols may also contain housekeeping symbols, which preferably should not be corrupted or modified. In one embodiment of the present invention, content symbols are part of a codeword with error check symbols, which are then considered in this embodiment to be part of the housekeeping symbols.

In accordance with an aspect of the present invention, housekeeping symbols are located in a received sequence of symbols on predetermined locations in the sequence of symbols. A receiver is informed of the format of the sequence of symbols, either from a standard format or in a message that defines the format. Such a message may be, for instance, a header of the sequence of symbols. Based on the knowledge of the structure of the sequence of symbols, the receiver may consider in one embodiment of the present invention, only the content symbols. This is illustrated in FIG. 15, wherein an actual sequence of symbols 1500, containing content symbols as well as housekeeping symbols, is shown. The content symbols of the sequence of symbols are modified (or restored) in accordance with a corruption mask 1502. A processor matches the corruption mask 1502 with the content symbols in the actual sequence of symbols by tracking where the housekeeping symbols are located. In one embodiment of the present invention, progress in the corruption mask is stopped when housekeeping symbols are detected. The moment the symbols are determined to be content symbols the corruption mask 1502 is again applied.

A corruption mask, in one embodiment of the present invention is a sequence of symbols, wherein a specific state of a symbol indicates where a corruption in sequence 1500 should take place or has taken place. In one embodiment the two sequences 1500 and 1502, except for patches with housekeeping symbols, run synchronously, for instance by applying the same clock signal. It may be that a symbol in 1500 is an n-state symbol, for instance represented by a plurality of lower radix symbols, such as bits. For instance assume that the content symbols in 1500 are 256-state symbols represented by a byte of 8 bits. In that case the clock or the derived clock of 1502 should be ⅛ of the clock of 1500. Synchronization symbols may be applied.

It may be that the sequence of symbols has an asynchronous format that applies some synchronization or header to identify the start of housekeeping symbols. Such synchronization symbols will also stop the progress of the corruption mask.

A transmission signal, in one embodiment of the present invention, has additional housekeeping symbols or signals, making synchronization with a sequence that is a corruption mask more complicated. In one embodiment of the present invention, a sequence of symbols is corrupted as soon as possible after it is created, for instance directly after capturing a digital video and/or audio signal or data signals and before certain housekeeping symbols are added to the sequence of symbols. For instance, before error correction codewords are created.

Figure 16:
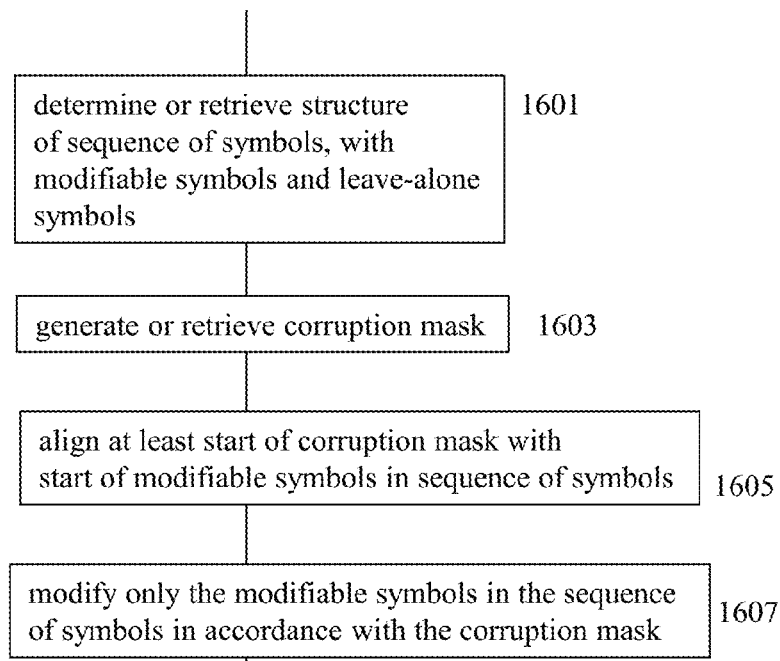
FIG. 16 illustrates steps performed in accordance with aspects of the present invention.

Steps of the process of applying a corruption mask are illustrated in FIG. 16. In step 1601 a structure of a sequence of symbols, especially the housekeeping symbols, is determined and the position of modifiable symbols is determined. In step 1603 a corruption mask is generated or retrieved from memory. In step 1605 the start of the corruption mask and the start of the modifiable symbols in the sequence of symbols are aligned. In step 1607 the modifiable symbols are modified, either corrupted, left unmodified or reversed in corruption, in accordance with the corruption mask. Not shown, but assumed, is that clock signals for progressing the corruption mask and the sequence of symbols are aligned or correctly maintained. Known systems such as PLL clock recovery systems, which are known to one of ordinary skill, can be applied for that purpose.

As indicated above, as corruption mask is a sequence of symbols, in which a specific symbol indicates a position of a symbol in the corresponding sequence of symbols to be corrupted. Because the purpose is not to corrupt all symbols in the sequence of symbols, the corruption mask should be a sequence with at least one type of symbol that does not occur for more than 60%. For instance, one may apply a sequence of binary symbols, with 0s and 1 s for instance, in which a 1 indicates that a corresponding symbol in the sequence of symbols should be modified or has been modified and should be reversed. This raises the question of how many symbols in a sequence of symbols can be corrupted without making review of the content too hard to be useless.

There is existing research that indicates at which error ratios, errors become unacceptable. This level appears to be well below a 50% symbol error ration, wherein errors at a lower rate are considered to be annoying in audio than in video. Also a distinction is made between (pseudo-) random errors and burst errors. A burst error may make one or more frames completely unplayable. Such an error burst requires a mask sequence to be completely or mostly completely be of 1s in case of a binary mask. It is of course possible to create and store and then retrieve such a binary corruption mask that has intermittently a series of single identical symbols. However, such a system of burst errors, while provided in accordance with an aspect of the present invention would almost certainly diminish enjoyment of a video or an audio program.

There is, for recovery, another issue that plays a role. One would preferable generate in an automatic way a corruption mask, or provide instructions thereto, rather than sending the complete mask.

Figure 17:
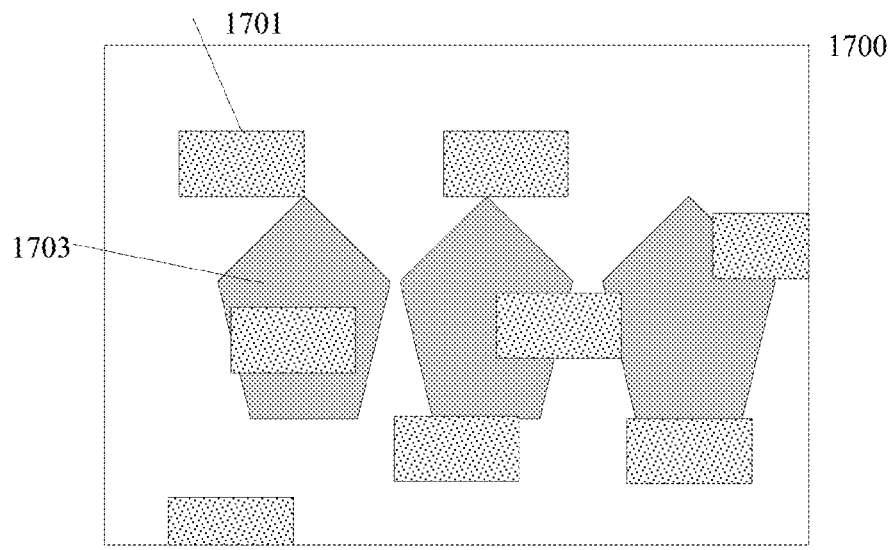
FIGS. 17 and 18 illustrate corruption masks in accordance with aspects of the present invention.
Figure 18:
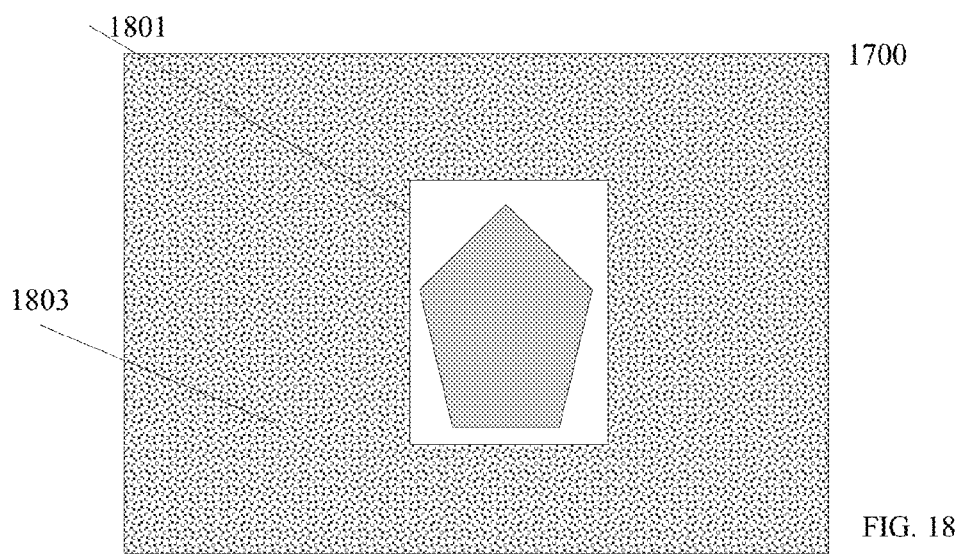

In one embodiment of the present invention, especially when recovery is not required, one can create a corruption mask from a sequence of binary symbols, wherein, with exception for periods with all the same symbols (all 1s for instance) to create an error burst, the occurrence of one type of symbols (for instance 1s) is in a pseudo random manner. One may also create a mask that propagates errors. This is illustrated in FIG. 17 which shows an image 1700, for instance a video frame in a series of frames. The frame displays 3 shapes wherein only one shape 1703 is identified with a numeral. Also provided are a plurality of corruption patches inside the frame 1700 of which only 1701 is identified. The patches cover the image, allowing a review but obscuring details. The error rate in this situation is about 15%. When a first corruption location is determined, then the error mask is automatically extended for a predetermined number of symbols. For instance, assume an image line of 32 pixels and a corruption mask for that line of 32 bits. The mask being $mask_{line}=$ [00000101000101100001000010010011]. Assume that a 1 indicates a modified symbol in the sequence of symbols, a symbol in this case being a pixel. A processor modifies the mask as follows: if a 1 is encountered in a mask then the next 2 symbols are also made 1. This is done up to the end of the $mask_{line}$. Modification does not go beyond a line.

This generates $mask_{linemod}=$ [00000111000111111001110011111111].

The $mask_{line}$ is copied for, for instance k lines, over generated line masks even if other line masks were generated and then the next generated $mask_{line}$ is modified as above. This will generate the patches as shown in FIG. 17. One may repeat the corruption pattern of a frame for about 1 to 5 seconds of video following frames or longer if desired. After that a new set of patches is generated based on a generating pattern. If a corruption pattern is to be reverted the corruptions should not propagate beyond a line and beyond a frame.

It is again noted that corruption patterns as in FIG. 17 can easily be stored in a memory and retrieved to be executed, but are required to follow a set of repeatable rules if one wants to revert the corrupted symbols.

It is also required to determine the corrupted symbol, which in an image frame or video frame may be a pixel determined by 24 bits. One way to modify a pixel is to give it a fixed value like all 1 s or all 0s or any other fixed value. However, that prevents the corrupted pixel from being reversible. One way of dealing with that is to reverse by way of corruption one or a number of bits defining the pixels, by making 0 a 1 and by making a 1 a 0. This can be easily reversed. Another way to modify a 24-bit pixel is to XOR the bits with a pre-determined word of 24 bits. One can change the predetermined word for instance in a series of 30 words that repeats. It is fairly easy to share these words and a corruption rule with a receiver.

It is not easy to create a binary generator that generates a sequence of bits with a skewed probability of 1 s of about 10%, 20% or even 30%. Known pseudo-random generators create sequences of is and 0s with a probability of about 50%. So, for automatic corruption mask generators this will not work for a corruption error rate that is lower than 50%.

In accordance with an aspect of the present invention a shift register based n-state generator is used to create a corruption mask. The inventor has shown is U.S. patent application Ser. No. 13/831,394 filed on March 14, 2013, which is incorporated herein by reference, and elsewhere, how a sequence of n-state symbols with n>2 and n>3 can be generated by an n-state shift register with feedback. The n-state sequence has a distribution of n-state symbols that is perfectly are almost perfectly uniform, with almost equal occurrence of each of the n-state symbols in a generated sequence. This means that in a generated 8-state sequence, which generates for instance symbols 0, 1, 2, 3, 4, 5, 6 and 7 that each of these symbols occurs in about ⅛ of the symbols in the sequence. In that case each symbol, for instance a symbol 5, determines an error position for 12.5% of the symbols. Two symbols, like 5 and 7 in a sequence, determine then a corruption rate of 25% and so on.

Assume part of an 8-state sequence being generated of 32 symbols to be: $mask_{line}$=[00516713021346572715423067311750]. As an example rule, each symbol 5 is extended for 3 symbols, but does not extend the line. This will create $mask_{line}$= [00555713021346555715553067311755]. Herein the symbol 5 creates or causes a modification in a corresponding sequence of symbols, for instance in a sequence of pixels. For clarification one may substitute all symbols not 5 with 0 thus providing the mask: $mask_{line}$= [00555000000005550055500000000055]. One may repeat this line mask for several lines in order to make patches. However, it should be clear that this is not required and that one may generate new mask lines per line, based on the generated sequence.

In one embodiment of the present invention one generates an n-state sequence as a corruption mask and selects one or more symbols that will cause a corresponding symbol in a corresponding sequence of symbols to be corrupted or modified.

As explained above, one can modify or corrupt a symbol permanently in a sequence of symbols by giving it a pre-determined value. One may also modify it reversibly by inverting it or by modifying it against a known symbol, which may be an n-state symbol with n>1 or with n>2 or n>3. In accordance with an aspect of the present invention, one may apply an n-state logic function to modify a symbol in the sequence of symbols. This requires a second symbol to modify it against. One may also apply an n-state inverter, which may be an n-state reversible inverter or an n-state non-reversible inverter.

In general, an n-state symbol is something like a 256-state symbol, such as a text symbol. Modification of such a symbol by a 256-state switching function or a 256-state inverter is well within the capabilities of processors as at least some of these operations are defined by a finite field GF(256) as used for instance in finite field arithmetic. However, DVD quality image and audio samples can be 16 bits, 24 bits or even higher quality samples. Pixels may be represented in 24-bits, 30 or 32 bits or even higher. In one embodiment of the present invention the entire representation of a pixel is modified. For instance a 24-bit word is added (with OR functions) to the pixel representation of 24 bits. This can be reversed by adding with XOR the same modifying word. One also can take for instance 8 bits in a pixel representation and modify this part of the signal representation with either an 8-bits word or by applying a 256-state switching function or a 256-state inverter.

While pixels are used as illustrative examples, a symbol may of course also represent a sound signal, text, or any other data.

Figure 19:
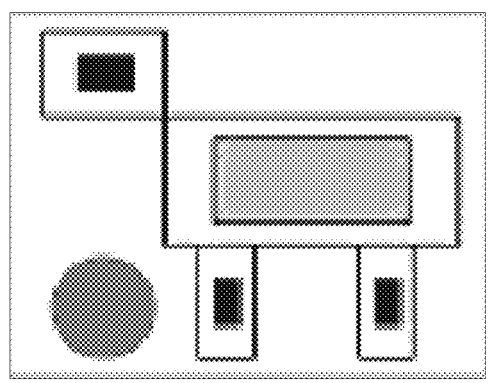
FIG. 19 illustrates an illustrative image that is to be corrupted.

FIG. 19 shows a gray coded image of 75 by 100 pixels. Each pixel is being coded in one of 8 gray levels. A screenshot of the Matlab program that normalizes a 256 level gray image to an 8-level gray image is provided in FIG. 20. The normalization is done to simplify the illustrative procedure. One may also use a 256-level gray level image and use an appropriate 256-level modification function (reversible or irreversible) to modify the pixel. As stated above, one may also modify part of a symbol, by splitting up a symbol, such as a 24-bits pixel, in for instance two or more binary representations, such as 3 8-bit words. One may then modify one or more of the 8-bits parts with a 256-level function.

The problem of corrupting a sequence of symbols can be analyzed in two steps: (1) to generate a corruption mask and (2) to apply the mask to modify the sequence.

In accordance with an aspect of the present invention, the generation of the corruption mask and the modification or corruption of the sequence takes place in real-time, within preferably the constraints of the well known sampling theorem and decorruption preferably also takes place in real-time, within the same constraints and as a sequence of symbols is being received. The latter embodiment, of course, requires that a sequence of symbols is received at a rate that not slower than dictated by the real-time constraints, as is known to one of ordinary skill.

In a further embodiment, the corruption and/or the decorruption takes place not in real-time. In a further embodiment of the present invention the corruption mask is transmitted to a receiver, preferably separate from the corrupted sequence of symbols, either through a separate transmission channel or via a different medium or at a different time than the sequence of corrupted symbols.

In yet a further embodiment of the present invention no corruption mask is transmitted to a receiver, but information or data how to generate a mask is provided to the receiver, allowing the receiver to implement a procedure to generate the corruption mask in real-time and synchronized with the corrupted sequence of symbols to decorrupt the corrupted sequence of symbols.

Figures 20, 21:
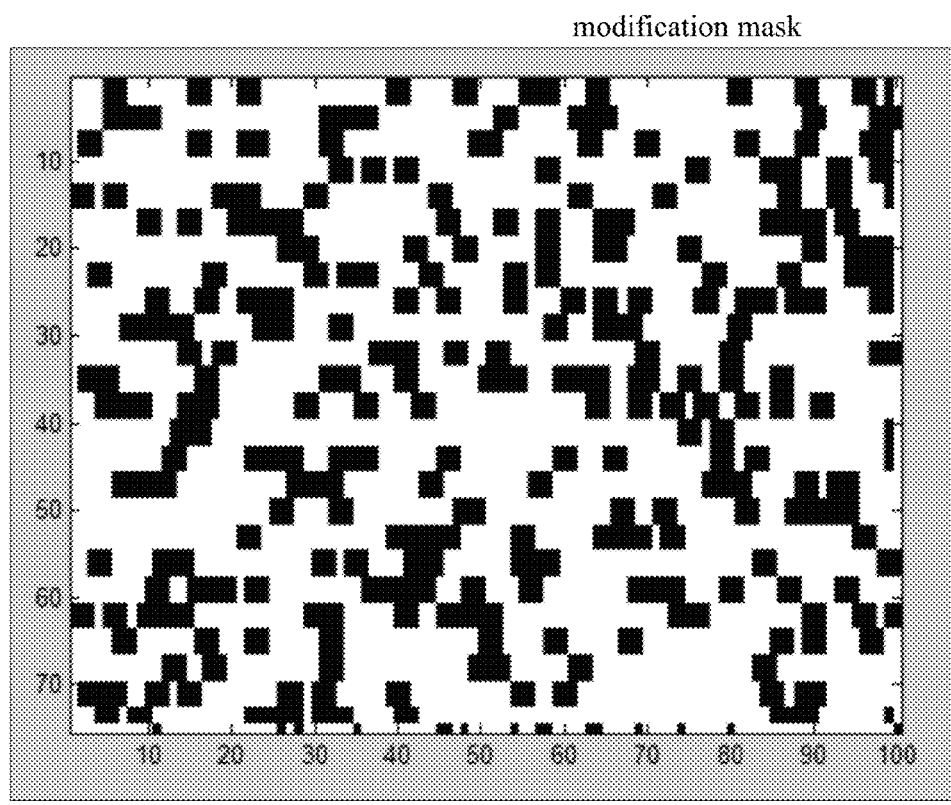
FIG. 20 shows a screenshot of a program.
FIG. 21 illustrates a corruption mask generated in accordance with an aspect of the present invention.

An illustrative example of a corruption mask for a 75 by 100 pixels image frame, which may be part of a video stream is shown in FIG. 21. The "blocked" or corrupted parts of the sequence of symbols (placed in an image frame in this case) are black, while the white parts are uncorrupted pieces of the sequence. A screenshot of a Matlab program that generates a mask is provided in FIG. 22A, FIG. 22B and FIG. 22C. The preference in this case is to generate a random appearing mask, which provides an annoyance level that is more difficult to achieve with a regular pattern such as horizontal or vertical bars or any other pre-set mask. However, other masks are fully contemplated and are included herein. Preferably such masks are generated automatically by instructions in a program.

In accordance with an aspect of the present invention, a corruption mask is generated by generating and applying a sequence of symbols, wherein certain symbols are designated to determine the corrupting spot in the sequence of symbols. The program as displayed in FIGS. 22A, 22B and 22C generates a sequence of 8-state symbols. This sequence generator is an 8-state Maximum Length sequence generator of 4095 8-state symbols. Because the image has 7500 pixels, the sequence is extended to 7500 pixels. The 8-state symbol represented by '6' is selected as determining a corrupting location. Because the corrupting 8-state sequence is ML each 8-state symbol appears exactly or about ⅛ of the total number of symbols. In order to extend the corruption each occurring corrupting location (corresponding to '6') is extended with 2 positions for 2 rows. One may also apply other extension methods, such as using other symbols (for instance '3') also as a corruption location. It should be clear that the herein provided methods allow to generate a corruption mask that appears to be random has a corruption rate that can be preset.

For instance if one prefers to have a lower corruption rate, no extensions may be applied. One may also apply a higher level of n-state symbols like a 32-state ML sequence, wherein each 32-state symbols provides a corruption rate of about 3-4% (1/32). If one prefers to not have repetitive masks, one may apply shift registers with more shift register elements. For instance one may create a very long sequence (a pseudo infinite length non-repetitive sequence) by using for instance a 10-element 32-state shift register. The higher the value of n (like 256), the shorter the shift register can be.

Presently a video frame may have pixel lines of at least 1000 color pixels and at least 1000 lines. For about 4 corruption positions on a pixel line of 1000 pixel then a 256-state ML would probably be sufficient. However, different approaches are possible to generate automatically a corruption mask. The instructions for generating a corruption mask depend on the desired corruption rate, the size of the frame or the sequence of symbols and a requirement for repetitiveness.

One may also modify an 8-state sequence, which may be an ML sequence, for long lines of pixels. On average each 8-ste ML sequence has 1 of 8 different states in 8 consecutive symbols. If one wants to create about 4 corruption locations on a line of 1000 pixels for instance by occurrence of a symbol '5', an 8-state ML sequence can be applied in the following way: (a) generate the ML sequence and at the first occurrence of symbol 5, mark the start of a part of a corruption mask. Extend the count of the mask with a desired number of pixel positions. The advancement of generating the ML sequence may be stopped during the extension. After the extension, continue the ML sequence. One rule may be that each symbol in the ML sequence is applied to about 30 positions of a pixel line, wherein the symbol 5 provides 30 corruption positions and any other symbol provides uncorrupted positions. Accordingly, 33 8-state symbols cover about 1000 ($\approx$33*30) pixels. The rule stops at the end of the pixel line (k=1000). The same rule may be applied for, for instance, the next 30 lines (for instance by saving and repeating the specific line mask), after which the ML sequence is further advanced to create a new mask.

One may of course also continue to run the ML sequence and continue generating the mask. The mask will repeat after a full length of the ML sequence has been generated.

It should be apparent to one of ordinary skill that any repeatable rule may be applied. For instance, advancement of the mask relative to pixels may depend on the symbol. (for instance advance 20 positions at symbol 1 and 40 positions at symbol 7). In case of a frame dependent mask (such as in images) one may apply the restrictions of the frame. However, it should be clear that one may also apply a mask to a sequence, rather than to a frame, as long as one takes into account and excludes the housekeeping symbols from masking In accordance with an aspect of the present invention, a mask is generated based on a corruption rate, which may be expressed as a relative rate, of symbols being corrupted relative to the total number of symbols in the sequence. In accordance with an aspect of the present invention, the relative corruption rate is not greater than .1%. In accordance with a further aspect of the present invention, the relative corruption rate is greater than .1% but not greater than 1%. In accordance with yet a further aspect of the present invention, the relative corruption rate is greater than 1% but not greater than 5%. In accordance with yet a further aspect of the present invention, the relative corruption rate is greater than 5% but not greater than 10%. In accordance with yet a further aspect of the present invention, the relative corruption rate is greater than 10% but not greater than 25%. In accordance with yet a further aspect of the present invention, the relative corruption rate is greater than 25% but not greater than 50%. In accordance with yet a further aspect of the present invention, the relative corruption rate is greater than 50%.

From the above description, one of ordinary skill will understand that one can design a corruption mask that meets desired corruption rate requirements.

Figures 22C, 23:
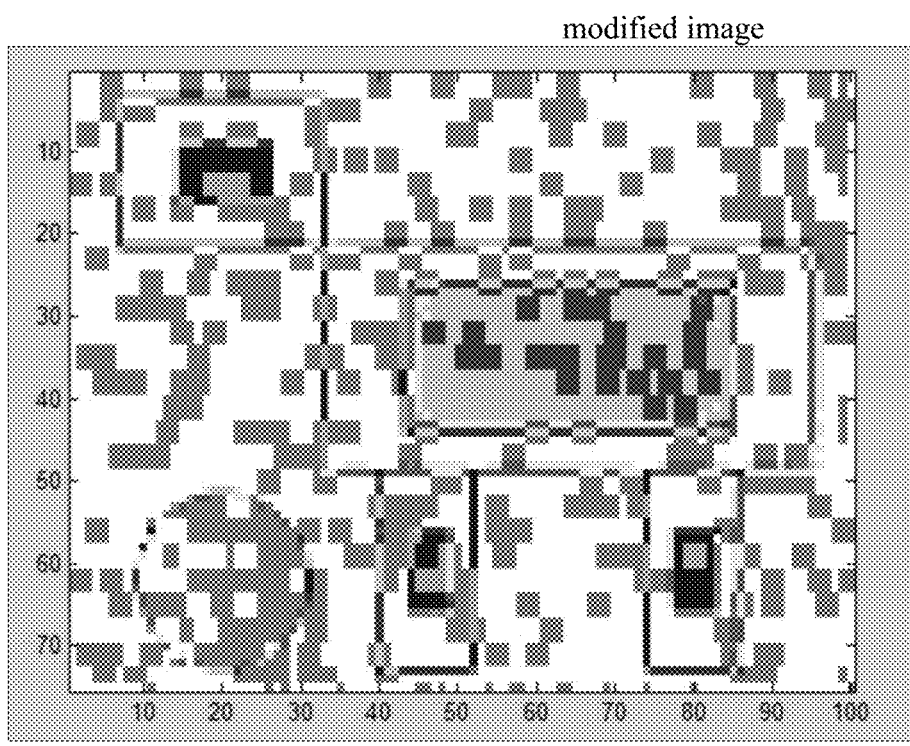
Figure 26:
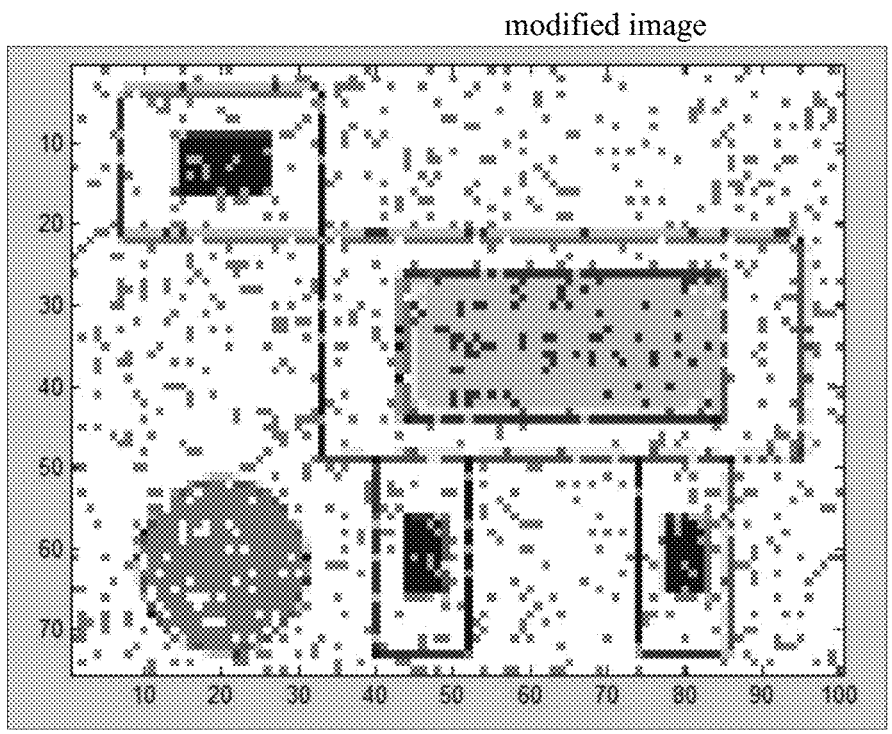
FIG. 26 illustrates a partially modified image in accordance with at least one aspect of the present invention.

It should also be clear that one can create a corruption mask with at least 2 consecutive symbols to be corrupted. In a further embodiment of the present invention, a corruption mask is created that corrupts at least 5 consecutive symbols. In a further embodiment of the present invention, a corruption mask is created that corrupts at least 20 consecutive symbols. In accordance with an aspect of the present invention a corruption mask is provided that provides a corruption pattern that provides a random or a pseudo-random corruption pattern. FIG. 25 provides a pseudo-random corruption mask for a 75 by 100 pixel image. FIG. 26 provides a corrupted 75 by 100 grayscale pixel image that is corrupted in a reversible manner in accordance with the mask of FIG. 25. FIG. 23 shows the reversibly corrupted image corrupted in accordance with the corruption mask of FIG. 21.

It is again emphasized that in accordance with an aspect of the present invention, also more regular corruption masks are provided, for instance using bars, or patches or figures or any corruption pattern that can be generated or stored and provided at desired moments.

In accordance with an aspect of the present invention, the corruption is irreversible. That means that corruption takes place with an irreversible function. One may replace the symbols in the sequence corresponding to the corruption mask with a single value (like a corresponding black value) or apply an irreversible switching function or inverter.

In accordance with a further aspect of the present invention, the corruption is a reversible process and the sequence can be decorrupted or restored to its original form. This is made possible to apply a reversible corruption function. For instance, an addition is used, wherein in the case wherein symbols are 256 gray levels a known 256-state symbol is added to an 256-state symbols that needs to be corrupted. If needed one may represent such an addition (or any other reversible n-state function) in binary form. One may add the same 256-state symbols or use a set of 256-state symbols that are selected based on a rule. Different reversible n-state functions are available. If one prefers to use n-state symbols, wherein n>256, it may be easier to add binary words. However, using a single reversible function (the addition) may offer opportunities to determine the corruption rule.

In case of a 2-input n-state logic function one may provide a known symbol on an input to modify the symbol on the second input. The known symbol may be selected from a list of known symbols, for instance stored on a memory. A processor may also keep track of corrupted and uncorrupted symbols and may use a previously corrupted or uncorrupted symbol in the sequence as the "known" symbol. One may also change the applied logic functions, or change inverters at an input or output of an 2-input n-state logic function.

Preferably, the corruption rules are difficult to determine. In that case it is preferred to apply different corruption n-state functions. If one wants to limit the storage of large n-state truth tables, one may apply a limited number of reversible n-state inverters. For instance a 1024-state 2-input/1 output switching function is represented by a 1024 by 1024 truth table. One may also selected a limited number (say 100, or more or fewer) 1024-state reversible inverters that are selected to corrupt a sequence of symbols. This provides sufficient variation without being easy to reconstruct without knowing the rules.

In one embodiment of the present invention one applies irreversible corruption functions that look at first sight as being reversible, but are in fact not. For instance one may apply a 1024-state irreversible inverter that has about 900 of its 1024 states reversible but has 124 duplicate states.

In many cases it is simpler to use n-state inverters for corruption (reversible or irreversible) which are one dimensional, rather than 2-dimensional truth tables. For instance a 24-bit pixel can be split up in 3 8-bit bytes. Each byte (which is 256-state) may be modified with for instance one of for instance 63 256-state inverters. The selection of each inverter may be done automatically, for instance based on a content of a shift register of an 8-state LFSR that is running as symbols are being processed. One may run 3 different LFSRs with different periods to determine the 3 contents, each content determining one of a set of different 56-state inverters. Each inverter determining an inversion of a byte in the 24-bit symbol. Preferably each inverter is reversible, so that for decorruption the same LFSRs can be applied, but now assigned to the reversing inverters.

Simple 8-state corruption examples are provides that allow to easily follow the corruption process and making clear that higher state and more complex corruption schemes are possible.

FIG. 22A, lines 1-40 illustrate in the screen shot of this Matlab program the generation of a 75*100=7500 8-state symbol sequence. The starting 8-state shift register state is [3 5 8 6] (in origin 1). The sequence is ML of length $8^4-1=4095$ and thus repeats itself at 4096. Different inverters can be applied to generate an ML sequence and the starting position of the shift register can be changed to generate a different sequence. Sequence generators of other lengths and other values of n can be generated also. In lines 43-45 the sequence is modified to corrupt for symbol 6. In lines 47-53 the corruption sequence is placed into a 75 by 100 frame format. In lines 59-91 the corruption locations on a line are extended with 2 and a corruption line is extended to 2 following lines, to create the mask of FIG. 21, taking into account the length of a line (100 pixels) and the number of lines in a frame (75). For display purposes the corruption spots are provided with the gray value 0 (black).

For illustrative purposes the generating functions are an addition and a multiplication over GF(8). However, this is not required. Other functions, even non-commutative functions and functions wherein F(0,0) (in origin 0) is not 0.

The screenshot of FIG. 24 shows the reversible corruption. The image that needs to be corrupted is first normalized to 8 gray levels, as shown in FIG. 20. The 8-state normalized image is then corrupted by corrupting all gray pixels corresponding to the black positions in the corruption masks with the 8-state inverter [1 2 3 4 5 6 7 8]→[5 6 7 8 1 2 3 4] which is a self reversing 8-state inverter. By applying this inverter again, the corruption is reversed. Lines 15 and 19 restore the normalized 8-state representation to a 256-state gray level.

Figure 27:
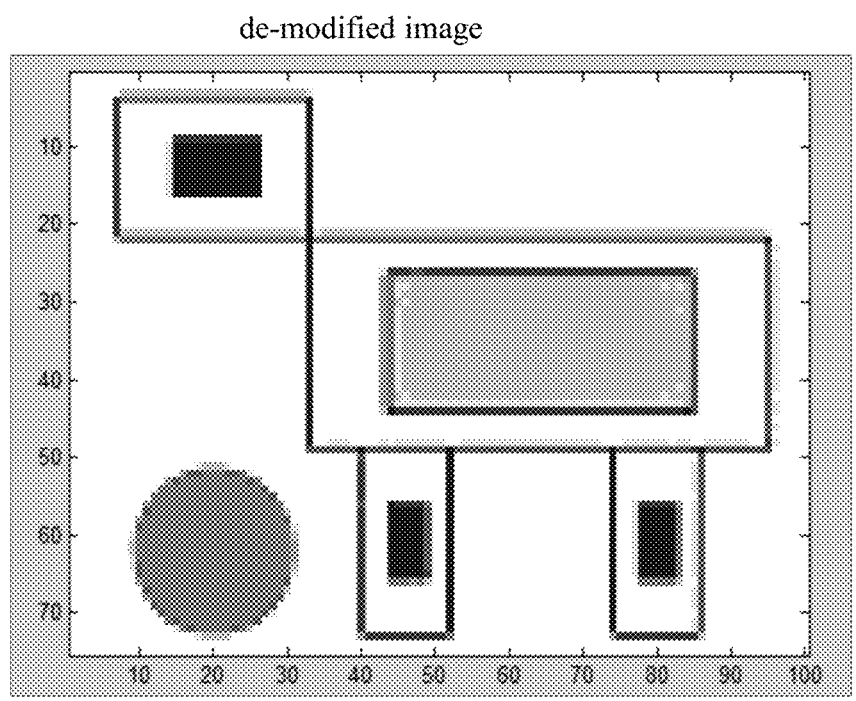
FIG. 27 shows the image as a result of decorrupting the image of FIG. 26.
Figure 28:
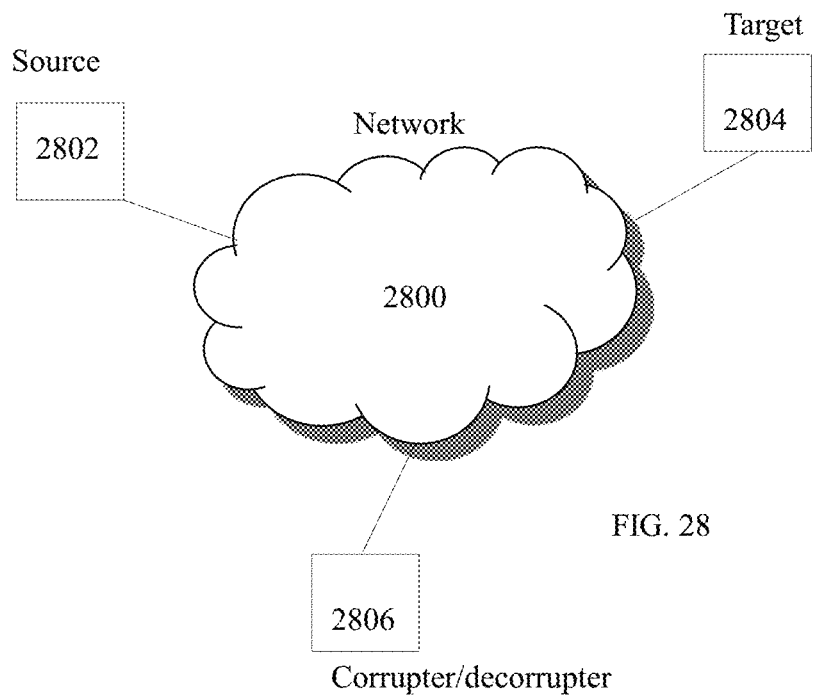
FIG. 28 illustrates a network in accordance with an aspect of the present invention.

FIG. 28 shows a corruption mask that does not apply extensions. FIG. 26 shows the image reversibly corrupted by the mask of FIG. 26 and FIG. 27 shows the decorrupted image recovered by applying the corruption mask and the corruption inverter again, and shows a perfectly recovered image. The apparent flaws in FIG. 27 are original and were caused by the normalization prior to corruption and are for instance visible in FIG. 19.

In accordance with an aspect of the present invention corruption and decorruption may be stopped and started again. In that case one may apply known sequence synchronization methods for an n-state sequence generator, for instance by saving the shift register state when the generation is stopped and using that state for restarting the process. One may also transmit synchronization information, for instance as shift register synchronization symbols, as provided for instance in U.S. patent application Ser. No. 13/118, 767 filed on May 31, 2011 which is incorporated herein by reference in its entirety. One may also send sync information related to a start or an end of a frame, such as an image frame, or a document page or a segment of an audio recording.

The methods and apparatus as provided above thus provide for real-time decorrupting by a receiver by generating synchronized with a received corrupted sequence a corresponding corruption mask and decorrupt the corrupted symbols. In accordance with various aspects of the present invention, a corrupted file from a source to a receiver is provided and at least one method to decorrupt the corrupted file, preferably in real-time, but also not in real-time, at the receiver is also provided.

This is illustrated in FIG. 28 with a network 2800, which may be the Internet, a source 2802 connected wired or wirelessly via the network 2800 to at least a target 2804 which is also connected to the network 2800. The source 2802 provides a corrupted file to target 2804 for playing. After playing and review of the corrupted file, a user of the target decides that a decorrupted file is desired. The decorruption method can be obtained from source 2802 or from a server 2806 also connected to network 2800. For instance decorruption is obtained by paying a fee. In a further embodiment of the present invention source 2802 provides a corrupted or a clean file to 2806 which is stored. Via a menu, target 2804 may view a corrupted file and decides to obtain a decorrupted file from 2806, for instance via payment. Server 2806 may first send a decorruption method, comprising a mask or a rule for a mask and a decorruption rule to target 2804 and then streams the corrupted sequence to 2804 which has the decorruption rule installed on a memory/processor unit. In a further embodiment 2806 provides a free streaming service, which contains at least corrupted files. In one embodiment of the present invention only part of the file is corrupted, for instance a start is decorrupted and the corruption rate of a file starts after a certain time and may be increased at later stages of the sequence.

In order for 2804 to play a decorrupted file a decorruption method can be obtained, for instance after payment, from either 2806 or from 2802. A decorruption method requires a much smaller file and transmission than the corrupted file. For instance a file may be a video file with 100 s of millions or billions of symbols. The decorruption method may require a file that is not even 1 Meg in size. Decorruption, thus requires much smaller storage and transmission capabilities. An administrator only has to track the decorruption method corresponding to a defined corrupted file.

A streaming service may provide a video program that has corruption, for instance at certain periods, even 100% corruption. By purchasing and downloading and installing a decorruption program on a processor a target can view a completely decorrupted program, wherein the decorruption program synchronized with the received corrupted file generates a decorrupted file.

One purpose of corruption of a file is to enable playing of a file, but only in a partial way. In accordance with another aspect of the present invention a line coded or even a compressed file is corrupted in accordance with reversible or irreversible methods as provided herein, and is decorrupted by a receiver.

A corruption mask as provided herein combined with the n-state corruption method can also be applied to create a fingerprint of a sequence, such as an image or a video frame. Rather than actually corrupting the sequence, one only generates the corruption mask and the corrupted symbols, but the symbols in the sequence remain uncorrupted. One can keep the corrupted symbols as a fingerprint of a frame. One may apply the corrupted symbols or the symbols corresponding to the corruption mask into an n-state shift register based scrambler. The end state of the shift register is a hash for a frame. One may also determine a hash for a plurality of masked frames. A plurality of hashes, for instance of a number of overlapping frames, for instance of frames 1-25, frames 2-26, frames 3-27. A number of running hash values is generated by a masked signal by applying non-binary shift register based methods thus forming a dynamic fingerprint. By using the methods provided herein, the dynamic range of the fingerprints is expanded. For instance if one changes the corruption functions, for instance by using different non-binary inverters, over a frame or between frames, then even homogeneous colored frames will provide different hash functions. Fingerprinting of multi-media such as video by hash functions is known. It is for instance described in U.S. Pat. No. 5,606,609 issued to Houser on Feb.25, 1997 and U.S. Pat. No. 7,240,210 issued to Mihcak on Jul. 3, 2007, which are incorporated herein by reference. Using the mask generating methods and modifying methods which may be reversible, as disclosed herein are believed to be novel.

N-valued symbols are also called n-state symbols herein, meaning the same. When using the term n-state or n-valued or multi-valued herein, in general non-binary or n>2 is intended, wherein n is an integer, unless indicated otherwise.

Also the term logic function or switching function is used herein, meaning the same. A logic function has a symbolic representation for instance by a truth table. The logic function describes a physical device that processes signals in accordance with the logic function, a symbol in general being represented by one or more signals. A logic function herein is represented by a truth table. A logic function can be a two input/single output logic function. This may also be called a dyadic function, a two-place function or a 2-argument function. An n-state addition, such as a modulo-8 addition is a dyadic function or a two argument function. Two arguments are processed in accordance with a mod-8 addition truth table to generate a modulo-8 addition residue. The truth table of an n-state dyadic function is in general represented by an n by n matrix. Multi-argument logic functions. with more than 2 arguments are also possible.

N-state or n-valued inverters are also disclosed herein. An n-state inverter is a monadic or single argument logic function. It has a single input and a single output. Its representation is in general a 1-dimensional vector describing the output states for each of the possible (n) input states. In general, logic functions as known, such as the mod-n addition or addition over GF(n) show that inputs 0 and 0 provide an output 0. Such a requirement does not apply here, unless specifically required. Also state 0 is not required to be inverted by an n-state inverter to a state 0, unless specifically required.

Figure 29:
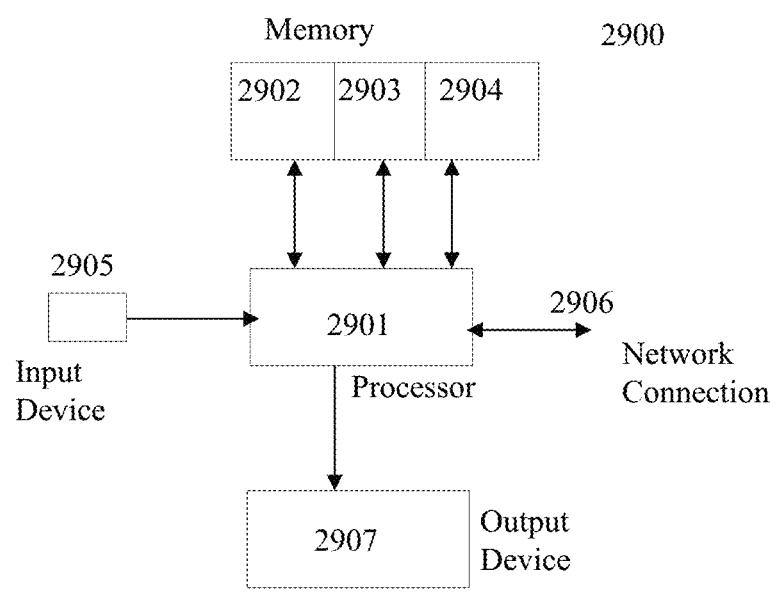
FIG. 29 illustrates a system in accordance with an aspect of the present invention.

The methods and apparatuses provided herein apply a processor based system as displayed in FIG. 29. The system contains a memory 2902 which contains instructions that can be retrieved by the processor 2901 to perform steps that implement the methods as disclosed herein. Memory 2903 contains data that can be applied to be processed by the processor based on instructions. Memory 2903 can also store data such as intermediate results. Memory 2904 is a mass storage medium, which can be electronic storage media, optical or magnetic storage media or any other medium that is enabled to store and provide massive amounts of data, for instance representing video data, audio data, graphics data, hexadecimal data, symbol data and the like. An input device 2905 such as a keyboard or a mouse can be used to control the processor or can be an input device such as a camera or a microphone. The processor can connect to a network via an input/output 2906 to a network device to send and to receive data. Data, images and menus can be displayed on an output device 2907, which may be a display screen, a printer, a loudspeaker or any other output device. Computing devices 2802, 2804 and 2806 are programmable processor controlled devices. These may be mobile wireless devices or wired devices.

The sequence of n-state symbols, which means a sequence or stream of non-binary symbols, is a digital medium or media stream. This means that the sequence of n-state symbols represents data that can be played or displayed on an appropriate medium, such as a display screen, an audio signal player, such as a loudspeaker, a print medium such as paper. Examples of n-state or non-binary symbols are pixels either in black or white or gray scale, for instance in a 256 level gray scale or full color pixels for instance in 24-bit or 32 bit coded pixels. Pixels may include an alpha channel code which determines a transparency of a pixel. Corruption of the n-state pixels may be a modification of a transparency in one embodiment of the present invention. Pixels may be part of a single frame image or a still image or may be part of a digital video stream with multiple frames. N-state or non-binary symbols may also be a representation of a digital audio signal. For instance a nonbinary symbol may be a sample of an audio signal that is digitally coded. An n-state or non-binary symbol may also be a character in a digital file or document.

An n-state or non-binary symbol may be represented as a word of bits or a binary word. For instance characters in a digital document are often coded as a byte of 8 bits. In one embodiment of the present invention a corruption mask that covers at least a length of one n-state symbol binary word may be synchronized with beginning and ending of a binary word representing the n-state symbol and in another embodiment of the present invention it is not synchronized with the symbol words, and thus may corrupt two adjacent n-state symbols.

A corruption mask may be a regular mask that will be the same for several consecutive frames for instance in a video stream. In that case the mask will not jump with each frame. If frame and mask sequence are not synchronized for at least several frames, for instance for at least 10 seconds of frames, the user may find the corruption too annoying to endure, which in some cases may not be what is desired. In another embodiment of the present invention one does not synchronize the mask sequence with a frame and the mask appears to jump constantly, providing a more random experience. This may be desirable in a corruption of an audio stream, wherein a regular corruption may appear as a discernable sound, which may be highly annoying, while random corruption may appear as irregular clicks. In a further embodiment of the present invention a media stream is a combined stream of digital video and audio. In one embodiment of the present invention both streams in the audio-video stream are corrupted in an individual way, wherein for instance each stream has a different mask and/or a different corruption rate and/or a different corruption function. One stream in the audio-visual stream may be corrupted while the other stream is uncorrupted.

N-state functions disclosed herein can be realized by multiple binary functions such as XOR functions. N-state functions, both inverters and two argument functions can be implemented by storing the truth functions in a memory and determining the output state based on relevant input states. An input state may form a relevant address to the intended output state. One may work in binary representation if so desired. One may also work with actual n-state signals by applying A/D and D/A converters to interface with binary memory.

The processing speed of corrupting and decorrupting symbols by a processor is preferably at a speed of at least 1000 n-state symbols per second, preferably at a speed of at least 32,000 n-state symbols per second and most preferably at a speed of at least 1,000,000 n-state symbols per second.

A non-binary or n-state 2-argument logic function in one embodiment of the present invention is an addition over GF(n) either stored as a truth table in a memory or realized with for instance XOR functions. The non-binary or n-state 2-argument logic function in an embodiment of the present invention is not an addition over GF(n) or is an addition over GF(n) wherein addition of state 0 and 0 does not generate 0. The non-binary or n-state 2-argument logic function in an embodiment of the present invention is a non-commutative function. The non-binary or n-state 2-argument logic function in an embodiment of the present invention is a commutative function. A non-binary or n-state 2-argument logic function herein is represented or is equivalent to a single truth table, even if it is realized by applying one or more inverters at an input and/or inputs and/or output. A non-binary or n-state logic function either 1-argument or multi-argument inputs is preferably reversible in one embodiment of the present invention and non-reversible in another embodiment of the present invention.

N-state or non-binary inverters in one embodiment of the present invention, are selected from columns or rows of an n-state logic function. Clearly, each n-state 2-argument truth table has n columns and rows, each column and row representing an n-state inverter. In one embodiment of the present invention n-state inverters are not selected from a single n-state 2-argument logic function. There are n! different n-state reversible inverters. Clearly, the selection in that case is much broader than selecting from a single n-state 2-argument truth table and there is no derivable relationship between many reversible n-state inverters, making it harder to predict which n-state inverter is being used.

A digital medium stream represents at least one medium. It may also be a multi-media stream if it contains for instance two of audio, image such as video and other data. A mask may be generated for all streams concurrently or for each stream individually. Each stream may be coded differently. For instance a video stream may have 24-bit equivalent pixels, audio may be coded in 12-bit equivalent sound sample size and data may be characters coded as 8-bit bytes. This may require different corrupting n-valued logic functions, appropriate for the corrupting task at hand (for instance an n1-state logic function for video, an n2-state logic function for audio and an n3-state logic function for other data, wherein n1, n2 and n3 are different integers).

It should also be clear that a mask may be created with an entirely different nonbinary sequence, wherein the number of states in the mask generating sequence is different from the number of states in the modifying functions. The number of states may also be the same, if that is appropriate for the intended use. To emphasize the possible difference in states, it may be expressed that a mask is generated by a k-state sequence generator, generating k-state (non-binary) symbols. The modifying functions are n-state. Thus k and n may be different integers, they may also be identical integers.

A device that receives a corrupted stream of symbols is in one embodiment of the present invention a wireless and portable computing device such as a smartphone, a computing tablet, a digital radio and/or tv receiver, a medium player. It also can be a wired and/or any computing device.

Figure 30:
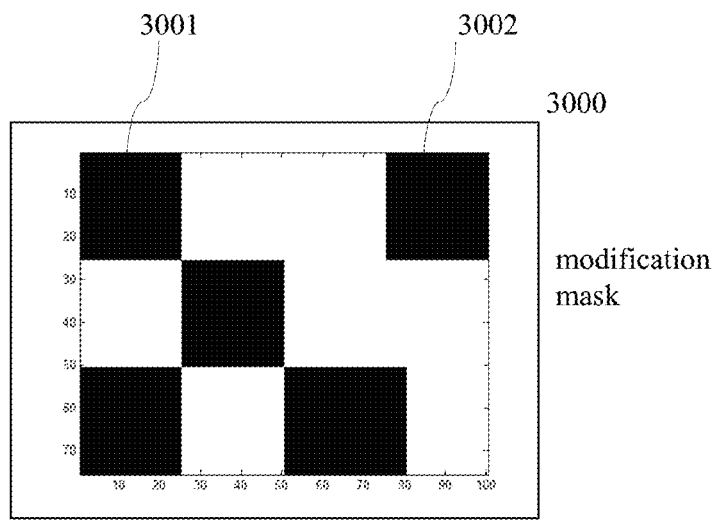
FIGS. 30, 31, 32, 33, 34, 35, 36 and 37 illustrate reversible modification of an image in accordance with various aspects of the present invention.
Figure 31:
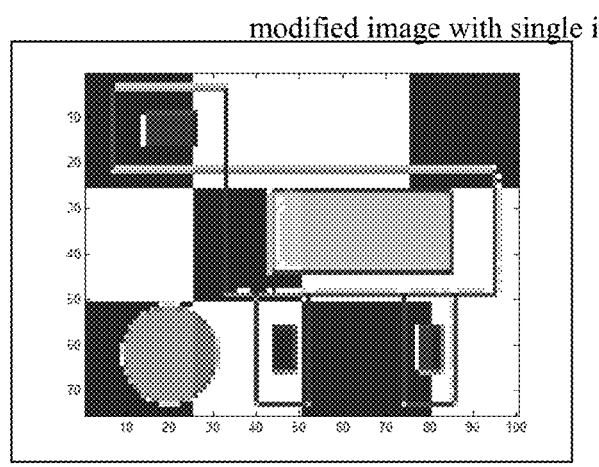

In accordance with an embodiment of the present invention one or more predetermined modification or corruption masks for partial reversible modification of an image is provided. This is illustrated in FIG. 30, which shows one of a plurality pre-determined modification masks. It is apparent that the mask 3000 has several large modification blocks of which 3001 and 3002 are identified. The image corresponding to the mask is in this illustrative example an image of 75 pixel lines of 100 pixels each. The pixels are for illustrative purposes of grey levels. However, the pixels may have any relevant representation including a color representation, for instance of 24 bits. In order to make the modification less predictable a number of prepared modification masks are created and stored. For instance, each mask is divided in blocks of 25 by 25 pixels of which for instance no more than 6 blocks and no fewer than 1 block is a modification block, which is indicated as a black block. Each mask has an ID. For demodification, the library of masks is transmitted to a receiver. The image of FIG. 19 is modified in accordance with the mask of FIG. 30 by using a single reversible inverter. The single inverter is revealed in the uniform modifications of large surface.

In accordance with an aspect of the present invention a modification mask is applied for a certain number of digital video image frame, to prevent too much jumping of the modification between frames. For instance a specific mask is applied for 5, 10, or 30 seconds, for example. Each second of video may be 60 frames, so a mask may be used for 300, 600 or 1800 consecutive video frames before a next mask is selected. Selection can be done automatically by generating a sequence of symbols, wherein each symbol represents a mask ID. For instance, if one uses 8 masks, the processor runs an 8-values LFSR sequence generator that generates symbols 1, 2, 3, 4, 5, 6, 7 and 8 in a pseudo-random way. Every generated symbol determines a mask every 5, 10 or 30 seconds. The start of the generator is synchronized with for instance the first frame of the movie.

Figure 32:
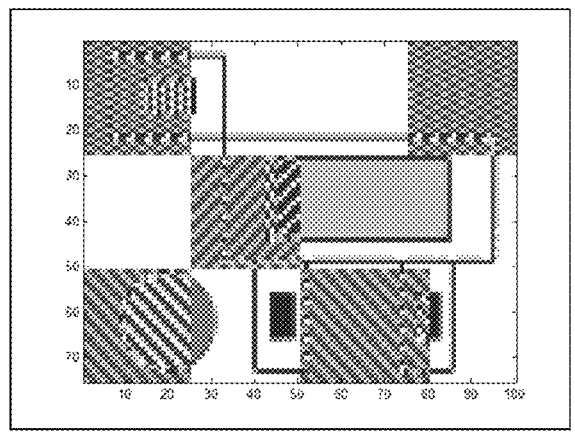

To keep a simple illustrative example, all grey levels are normalized to 8 levels of grey. The single modification applies the reversible inverter [2 3 4 5 6 7 8 1]. In one embodiment of the present invention different inverters are used. This is illustrated in FIG. 32 wherein 4 different inverters are applied in a regular pattern. It is preferable to use in a single image or image frame at least 2 and preferable more different non-binary modifying functions, which may be inverters or 2 input/one output functions. In the latter case a second input signal has to be provided, which may a predetermined value that is for instance updated. Such a constant may be a symbol generated by an LFSR sequence generator. By having access to the modification mask at the receiver and the modifying functions and the order in which they are applied with the modification mask, the modified image can be demodified. The processor in the receiver has to reverse the modifying function or the receiver is provided with the actual demodifying function.

The pre-determined masks may be any mask, including the previously illustrated masks. Some variation in the use of masks will increase the annoyance level and makes the whole process of demodification less predictable and more difficult to crack. In accordance with an aspect of the present invention preferably at least 2 different modification masks are used and more preferably more than 10 different modification masks are used. In accordance with an aspect of the present invention the surface or part of the image that is modified varies per mask. In accordance with an aspect of the present invention the surface or part of the image that is modifies increases over a series of masks.

Figure 33:
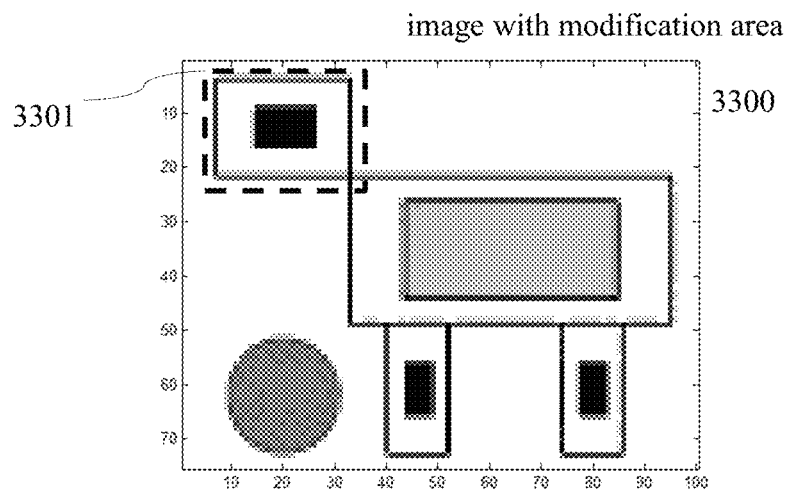
Figure 34:
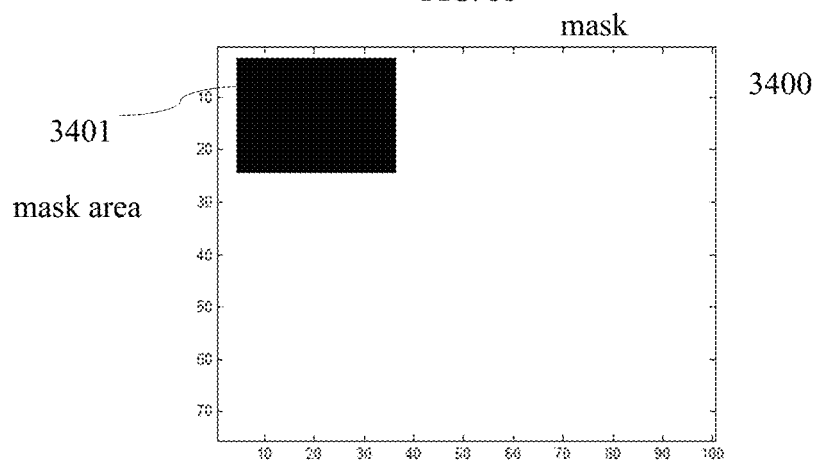
Figure 35:
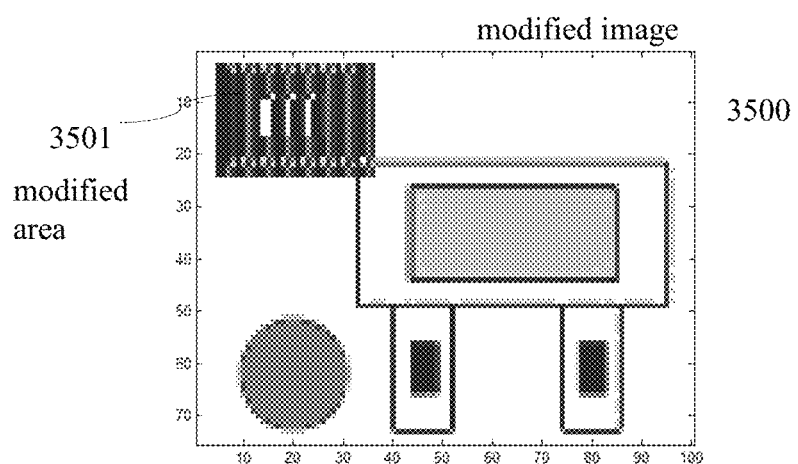

In accordance with an aspect of the present invention a modification mask is generated that modifies a specific area of an image, for instance an area that includes part of an image of a specific object, person or a specific part of an object or a person. This is illustrated in FIG. 33 wherein an area 3301, which includes a 'head' of the dog figure in image 3300 is marked as to be modified. In one embodiment of the present invention that area is marked by a user on for instance a touch screen by a shape such as a rectangle 3301. The marking shape can be any shape and can be the exact shape as drawn by a user or is formed as one of a series of basic masking shapes stored on the computing device with the touch screen and can be a circle an oval or ellipse or any shape that is useful. The processor extracts and creates the mask as shown in FIG. 34 in mask 3400 with masking area 3401. FIG. 35 illustrates the modified image 3500 with reversibly modified area 3501. The processor parallel to modifying the image also generates a file with the mask and modifying and/or demodifying instructions synchronized with the modified image which may of course be a video image.

Figure 36:
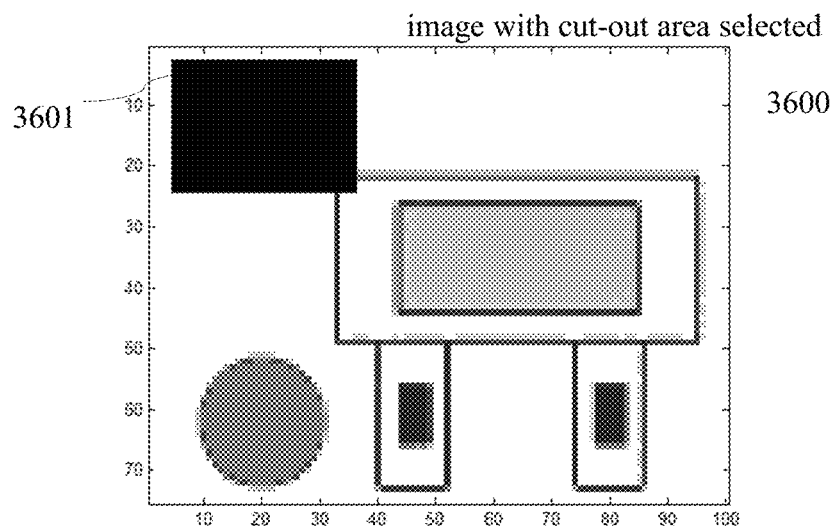
Figure 37:
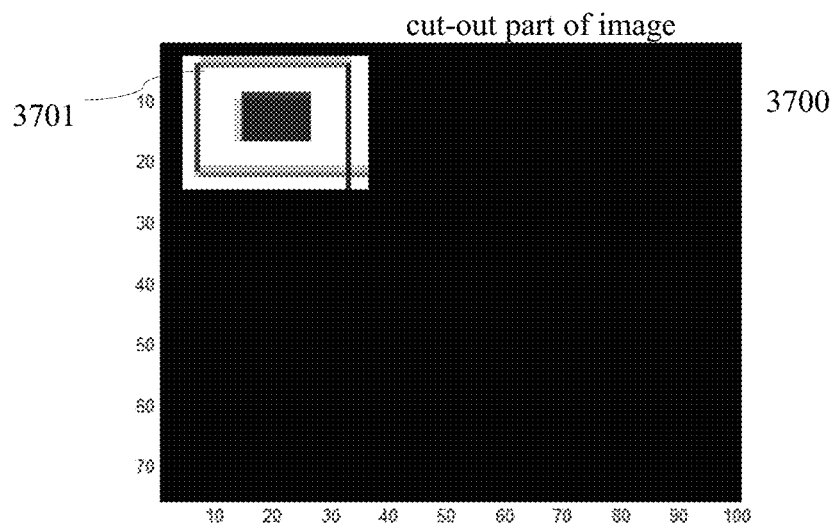

Segmentation of images such as video images, for instance by foreground/background marking in an image, is well known. For instance face detection in an image is disclosed in U.S. Pat. No. 6,940,545 issued on Sep. 8 2005 to Ray et al., U.S. Pat. No. 8,149,280 issued on Apr. 3, 2012 to Koji Yoda, which are incorporated herein by reference. Object tracking in image sequences is well known and can be done by fairly simple blob tracking or using feature extraction techniques. Different techniques are described in SURVEY ON MOVING OBJECT TRACKING IN VIDEO, by Barga Deori and Dalton Meitei Thounaojam in International Journal on Information Theory (IJIT), Vol.3, No.3, July 2014, downloaded from <http://airccse.org/journal/ijit/papers/3314ijit04.pdf > which is incorporated herein by reference. In accordance with an aspect of the present invention a user marks on a screen such as a touchscreen on a smartphone an object or part of an object or person. Tracking software on the smartphone extracts an area that has to be tracked in subsequent images in a sequence of images and generates a sequence of modification masks from the tracking area as an object or person moves in an image frame. Preferable the processor generates a simple masking area like 3401 that circumscribes the object or person or part of the object or person that is to be tracked in the sequence of image frames. As a consequence a mask is created over consecutive frames of the image at different locations of a frame, creating a moving or dynamic mask that closely follows the moving object. As a result of the tracking the processor on the device which may be a smartphone or a digital camera or a processor on a computer also modifies the tracking area in accordance over the sequence of images with one or more non-binary modifying functions in accordance with the automatically generated tracking/modifying mask and generates automatically the required demodifying file that would enable a receiver to demodify the modified image sequence. Because of the tracking software, the modifying mask thus tracks the object or person or part thereof In accordance with an aspect of the present invention a modification mask is generated in one of different ways as disclosed above. However, rather than modifying the image with the non-binary modification function, the image part coinciding with modification mask is extracted or removed from the image and stored in a separate file. This is illustrated in FIG. 36 which shows and image 3600 with image part 3601 removed. The removed part or cut-out 3701 is stored in a separate file 3700 as illustrated in FIG. 37. The image 3700 has only a small part 3701 as its useful area. It would not be useful to send all the dark area as part of an image. Accordingly the image 3700 is sent as image 3701 with the area coordinates and the frame ID where the cut-out has to be placed to restore the original image. To prevent reconstruction from modified images by trial-and-error and using interpolation and prediction techniques it may be more secure to not include any information, but only a black are, alternatively filled with unrelated data. Reconstruction takes place by combining image 3600 with image 3701.

It is believed that such tracking and modifying/demodifying system or machine would be desirable for many users of smartphones such as iPhones and Android smartphones and tablets or any other image displaying device or machine. Thus, it would be desirable to offer instructions thereto as standard software or app that can be installed on smartphones or any other image processing and displaying device. The image device generates 2 files: a modified image file and a file that enables demodifying the modified image. If a delay of about 1-5 image frames is acceptable, then the application will work in real-time or near-real-time mode. It is noted that streaming images often experience some delay that is addressed by buffering and that a machine demodifies a modified image within 1-5 image frames is considered to be real-time or near-real-time streaming. Demodifying a stored modified video sequence is also enabled.

Aspects of the present inventions provided herein address the technological issue of partially modifying, in a reversible way, an image which is a video image or a still image, transmitting the partially reversibly modified image as signals over a network and receiving and displaying in a first embodiment of the present invention the partially reversibly modified image, which may be a video image on a display screen. In a second embodiment of the present invention instructions and a mask are also sent to a processor in a receiver that allows the processor to de-modify or restore the partially reversibly modified image to its unmodified state. The steps for modification, transmission, reception, demodification and displaying are all performed by electronic devices or processors or machines that operate on signals. The steps have been implemented and executed on a processor and have been proven to work and are illustrated in the figures. The instructions or steps are believed to be unknown and unconventional. The specific instructions, masks and modifying functions such as inverters are novel, they improve the performance of the processor and the combination of a processor with the herein provided instructions transforms data to previously unknown formats. They also create a machine that is no longer a generic computer, but is now a customized device or machine system that performs a novel and useful function that is described herein in terms of its structural components. A device that performs a switching function, like a NAND or AND or XOR gate, is a structural device. The n-valued switching functions implemented herein for instance on an addressable memory are also structural devices, but out of necessity described by their function. However, one of ordinary skill would understand that any n-valued inverter or 2-input/single output switching function can be realized by placing the related switching table in an addressable memory or by other alternative means, described elsewhere by the inventor. The steps described herein cannot and would not be reasonably performed by a human with paper and pencil.

Figure 38:
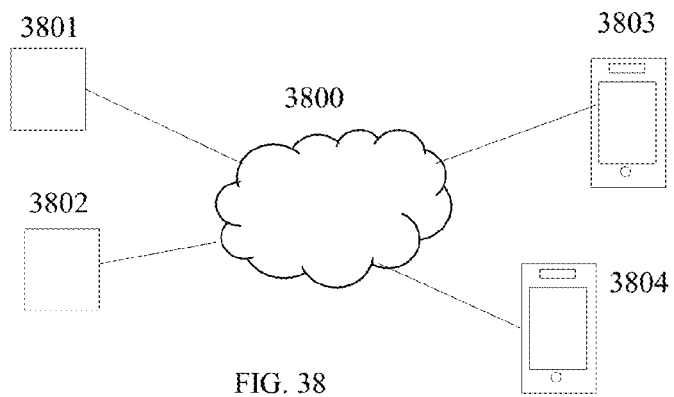
FIGS. 38 and 39 illustrate systems in accordance with various aspects of the present invention.

Nowadays, main computing, image recording, image display, sound display and communication functions are performed on processor and memory based smartphones further containing a camera, a loudspeaker a microphone, a touchscreen and communication circuitry, including for communication with a wide-area network such as a cellphone network and for local communication such as Bluetooth and WiFi. Local connections also enable connection to a network such as the Internet or the "cloud" 3800 as illustrated in FIG. 38. A smartphone 3803 is connected through a network 3800 with servers 3801 and 3802 and other smartphone 3804.

Image exchange including video image exchange is fully enabled nowadays. There are different forms of image exchange of which several are mentioned to illustrate aspects of the present invention, but are not intended to be limiting. A first method of image exchange is in a streaming manner from a server, for instance 3801 to a device such as a smartphone 3802. An image file may be transferred from a server 3801 to a smartphone 3803.

There may be a desire to modify an image in accordance with aspects as provided herein for several reasons. For instance a content owner may want to make watching the image less enjoyable because of modifications and allows full quality if demodifying data is purchased and installed on the smartphone. One may also want to cover or protect content that should be held private or is inappropriate for certain viewers, unless the viewer, with or without payment installs specific de-modifying software. In accordance with an aspect of the present invention that software is downloaded from a server, for instance server 3802, which hosts an app store. The demodifying software in accordance with an aspect of the present invention is related to a specific video file, such as a movie or an episode of a series. In order to watch the high quality version one has to install the demodifying instructions and masks from the app store.

Figure 39:
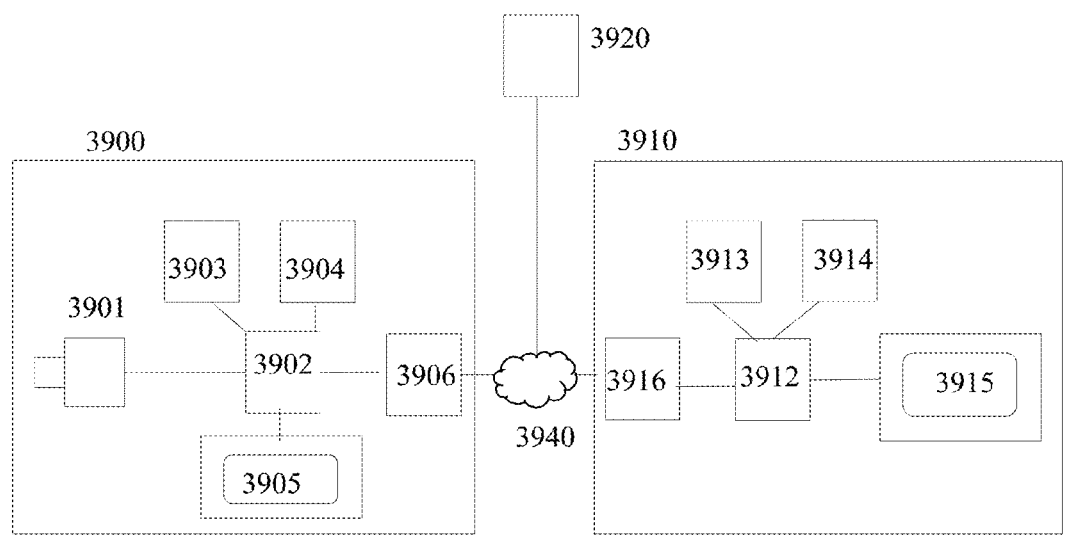

Nowadays, users of smartphones often exchange videos or other images. The exchange may take place via social webpages whereon privacy is not guaranteed. In some cases it may be desirable or required to partially reversibly modify images, using one of the approaches as provided herein in accordance with various aspects of the present invention. Only trusted receivers will be provided with the de-modifying software or instructions and masks. As illustrated in FIG. 39 a smartphone 3900 contains a camera 3901 for recording images, a processor 3902 to process and partially modify digital image data provided by the camera in accordance with modification instructions on a memory 3903 and a mask stored on memory 3904. Memories 3903 and 3904 may be different parts of the same memory. A touch screen 3905 is used as an input device. The modified image data is transmitted via a transmission device 3906 to a network 3940. The modified image data is transmitted to a second device 3910 which may also be a smartphone, either directly or via a server such as a server 3920. The device 3910 has communication receiving circuitry 3916 which provides the modified image data to processor 3912 which has memory 3913 with de-modification instructions and memory 3914 with the modification masks. Memories 3913 and 3914 may be different parts of the same memory. Memory 3913 may have the same instructions as 3903. However, the processor 3912 when alerted that de-modification of image data is required can easily invert or reverse the modification instructions into de-modification instructions as all instructions are reversible. The processor using the data from 3913 and 3914 demodifies the modified image data into the original not yet modified image data.

The de-modification of the examples provided herein is perfect and all are identical to FIG. 27 or FIG. 19 and thus need not to be repeated.

Aspects of modification are applied to tracking apparatus as disclosed in U.S. patent application Ser. No. 14/147,569 filed on Jan. 5, 2014 which is incorporated herein by reference.

While there have been shown, described and pointed, out fundamental novel features of the invention as applied to preferred embodiments thereof, it will be understood that various omissions and substitutions and changes in the form and details of the devices, systems and methods illustrated and in their operation may be made by those skilled in the art without departing from the spirit of the invention. It is the intention, therefore, to be limited only as indicated by the scope of the claims appended hereto.

The following patent applications, including the specifications, claims and drawings, are hereby incorporated by reference herein, as if they were fully set forth herein: (1) U.S. Non-Provisional patent application Ser. No. 10/935, 960, filed on Sep. 8, 2004, entitled TERNARY AND MULTI-VALUE DIGITAL SCRAMBLERS, DESCRAMBLERS AND SEQUENCE GENERATORS; (2) U.S. Pat. No. 7,002,490 issued on Feb. 21, 2006, entitled TERNARY AND HIGHER MULTI-VALUE SCRAMBLERS/DESCRAMBLERS; (3) U.S. Non-Provisional patent application No. 10/912,954, filed Aug. 6, 2004, entitled TERNARY AND HIGHER MULTI-VALUE SCRAMBLERS/DE- SCRAMBLERS; (4) U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA; (5) U.S. Pat. No. 7,218,144, issued on May 15, 2007, entitled SINGLE AND COMPOSITE BINARY AND MULTI-VALUED LOGIC FUNCTIONS FROM GATES AND INVERTERS; (6) U.S. Pat. Ser. No. 11/065,836 filed Feb. 25, 2005, entitled GENERATION AND DETECTION OF NON-BINARY DIGITAL SEQUENCES; (7) U.S. Pat. No. 7,397,690 issued on Jul. 8, 2008, entitled MULTI-VALUED DIGITAL INFORMATION RETAINING ELEMENTS AND MEMORY DEVICES; (8) U.S. Non-Provisional patent application Ser. No. 11/618,986, filed Jan. 2, 2007, entitled Ternary and Multi-Value Digital Signal Scramblers, Descramblers and Sequence Generators; (9) U.S. Non-Provisional patent application Ser. No. 11/679,316 filed Feb. 27, 2007, entitled Methods And Apparatus In Finite Field Polynomial Implementations.; (9) U.S. Non-Provisional patent application Ser. No. 11/566,725, filed on Dec. 5, 2006, entitled: Error Correcting Decoding For Convolutional And Recursive Systematic Convolutional Encoded Sequences; (10) U.S. Non-Provisional patent application Ser. No. 11/739,189, filed on Apr. 24, 2007 entitled: Error Correction By Symbol Reconstruction In Binary And Multi-Valued Cyclic Codes; (11) U.S. Non-Provisional patent application Ser. No.11/969,560 filed Jan. 4, 2008, entitled: Symbol Error Correction by Error Detection and Logic Based Symbol Reconstruction; (12) U.S. Non-Provisional patent application Ser. No. 11/964,507 filed on Dec. 26, 2007 entitled Implementing Logic Functions With Non-Magnitude Based Physical Phenomena, and (13) U.S. Non-Provisional patent application Ser. No. 14/064089 filed: Oct. 25, 2013 entitled Methods and Apparatus in Alternate Finite Field Based Coders and Decoders.

The invention claimed is:

1. An apparatus to process a digital video stream of pixels generated by a camera, each pixel being represented by one or more signals, comprising:
    a memory enabled to store and provide data including instructions;
    a processor configured to retrieve and execute instructions from the source memory to perform the steps:
        obtaining the digital video stream of pixels generated by the camera;
        retrieving a modification mask that identifies part of a first digital video frame in the digital video stream of pixels for reversible modification;
        reversibly modifying a plurality of pixels in the digital video stream in accordance with the modification mask to create a reversibly modified digital video stream; and
        transmitting the reversibly modified digital video stream to a viewing device for display on a display screen.

2. The apparatus of claim 1, further comprising:
    a processor on the viewing device obtaining the modification mask and de-modification instructions that reverses the reversible modification of the first video frame; and
    the processor on the viewing device processing the reversibly modified digital video stream in accordance with the modification mask and the de-modification instructions to generate a de-modified first frame of the reversibly modified digital video stream; and
    the display screen on the viewing device displaying the demodified first frame of the reversibly modified digital video stream.

3. The apparatus of claim 1, wherein the display screen on the viewing device displays the first frame of the reversibly modified digital video stream.

4. The apparatus of claim 1, wherein a modification mask is based on a sequence of symbols generated by a sequence generator.

5. The apparatus of claim 1, wherein the modification mask is selected from a memory containing a plurality of modification masks.

6. The apparatus of claim 1, wherein each modification mask corresponds to a specific video frame.

7. The apparatus of claim 1, wherein an area on a screen is identified and the processor extracts the mask from the area that is identified.

8. The apparatus of claim 7, wherein the area contains at least a part of a moving object or person and the processor tracks the part of the moving object or person to create a moving mask.

9. The apparatus of claim 1, wherein the apparatus is a smartphone.

10. The apparatus of claim 1, wherein the reversibly modifying is performed by a non-binary inverter or a non-binary two argument switching function on the processor.

11. A method for partially modifying a digital video stream of pixels generated by a camera, each pixel being represented by one or more signals, comprising:
    a processor obtaining the digital video stream of pixels generated by the camera;
    retrieving from a memory a modification mask that identifies part of a first digital video frame in the digital video stream of pixels for reversible modification;
    reversibly modifying a plurality of pixels in the digital video stream in accordance with the modification mask to create a reversibly modified digital video stream; and
    transmitting the reversibly modified digital video stream to a viewing device for display on a display screen.

12. The method of claim 11, further comprising:
    a processor on the viewing device obtaining the modification mask and de-modification instructions from a memory on the viewing device that enables reversing the reversible modification of the first video frame; and
    the processor on the viewing device processing the reversibly modified digital video stream in accordance with the modification mask and the de-modification instructions to generate a de-modified first frame of the reversibly modified digital video stream; and
    the display screen on the viewing device displaying the demodified first frame of the reversibly modified digital video stream.

13. The method of claim 11, wherein the display screen on the viewing device displays the first frame of the reversibly modified digital video stream.

14. The method of claim 11, wherein a modification mask is based on a sequence of symbols generated by a sequence generator.

15. The method of claim 11, wherein the modification mask is selected from a memory containing a plurality of modification masks.

16. The method of claim 11, wherein each modification mask corresponds to a specific video frame.

17. The method of claim 11, wherein an area on a screen is identified and the processor extracts the mask from the area that is identified.

18. The method of claim 17, wherein the area contains at least a part of a moving object or person and the processor tracks the part of the moving object or person to create a moving mask.

19. The method of claim 11, wherein the apparatus is a smartphone.

20. The method of claim 11, wherein the reversibly modifying is performed by a non-binary inverter or non-binary two argument switching function on the processor.

* * * * *